(12) United States Patent
Gu et al.

(10) Patent No.: US 10,579,150 B2
(45) Date of Patent: Mar. 3, 2020

(54) CONCURRENT DETECTION OF ABSOLUTE DISTANCE AND RELATIVE MOVEMENT FOR SENSING ACTION GESTURES

(71) Applicant: Google Inc., Mountain View, CA (US)

(72) Inventors: Changzhan Gu, Milpitas, CA (US); Jaime Lien, Mountain View, CA (US)

(73) Assignee: Google LLC, Mountain View, CA (US)

( * ) Notice: Subject to any disclaimer, the term of this patent is extended or adjusted under 35 U.S.C. 154(b) by 364 days.

(21) Appl. No.: 15/424,263

(22) Filed: Feb. 3, 2017

(65) Prior Publication Data

US 2018/0157330 A1 Jun. 7, 2018

Related U.S. Application Data

(60) Provisional application No. 62/430,276, filed on Dec. 5, 2016.

(51) Int. Cl.
*G06F 3/01* (2006.01)
*G01S 13/34* (2006.01)
(Continued)

(52) U.S. Cl.
CPC .............. *G06F 3/017* (2013.01); *G01S 7/415* (2013.01); *G01S 13/0209* (2013.01);
(Continued)

(58) Field of Classification Search
CPC .. G01S 7/52063; G01S 13/343; G01S 13/888; G01S 13/32; G01S 13/38; G01S 13/874; G01S 13/50; G01S 7/03
See application file for complete search history.

(56) References Cited

U.S. PATENT DOCUMENTS 3,610,874 A 10/1971 Gagliano
3,752,017 A 8/1973 Lloyd et al.
(Continued)

FOREIGN PATENT DOCUMENTS

CN 202887794 4/2013
CN 103355860 1/2016
(Continued)

OTHER PUBLICATIONS

P. Molchanov et al., "Short-Range FMCW Monopulse Radar for Hand-Gesture Sensing"; publication No. 978-1-4799-8232-5/15$31.00@2015IEEE; IEEE, Piscataway, New Jersey, USA; copyright in the year 2015. (Year: 2015).*
(Continued)

*Primary Examiner* — Bernarr E Gregory
(74) *Attorney, Agent, or Firm* — Colby Nipper PLLC

(57) ABSTRACT

A gesture detection system uses two radar tones to concurrently detect absolute distance and relative movement of a target object. A radar-based detection device alternates transmitting a first radar tone and a second radar tone via a radar-emitting device, and then captures a first return signal and a second return signal that are generated by the first radar tone and second radar tone reflecting off the target object. The radar-based detection device demodulates the return signals into a first set of quadrature signals and a second set of quadrature signals and, in some cases, generates a first set of digital samples and second set of digital samples from the respective quadrature signals. Various aspects process the first set of digital samples and second set of digital samples to concurrently identify absolute distance and relative movement and, at times, determine an in-the-air gesture performed by the target object.

20 Claims, 16 Drawing Sheets

(51) Int. Cl.
  *G01S 7/41* (2006.01)
  *G01S 13/88* (2006.01)
  *G06F 3/03* (2006.01)
  *G01S 13/56* (2006.01)
  *G01S 13/02* (2006.01)
  *G01S 13/00* (2006.01)

(52) U.S. Cl.
  CPC ............ *G01S 13/347* (2013.01); *G01S 13/56* (2013.01); *G01S 13/88* (2013.01); *G06F 3/0304* (2013.01)

(56) References Cited

U.S. PATENT DOCUMENTS

| | | |
|---|---|---|
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,298,715 A | 3/1994 | Chalco et al. |
| 5,341,979 A | 8/1994 | Gupta |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,080,690 A | 6/2000 | Lebby et al. |
| 6,101,431 A | 8/2000 | Niwa et al. |
| 6,210,771 B1 | 4/2001 | Post et al. |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,543,668 B1 | 4/2003 | Fujii et al. |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 7,019,682 B1 | 3/2006 | Louberg et al. |
| 7,134,879 B2 | 11/2006 | Sugimoto et al. |
| 7,158,076 B2 * | 1/2007 | Fiore ..................... G01S 13/38 342/118 |
| 7,164,820 B2 | 1/2007 | Eves et al. |
| 7,205,932 B2 * | 4/2007 | Fiore ..................... G01S 13/32 342/104 |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,569,189 B2 | 10/2013 | Bhattacharya et al. |
| 8,614,689 B2 | 12/2013 | Nishikawa et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | Desalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautianinen et al. |
| 9,346,167 B2 | 5/2016 | O'Connor et al. |
| 9,354,709 B1 | 5/2016 | Heller et al. |
| 9,511,877 B2 | 12/2016 | Masson |
| 9,569,001 B2 | 2/2017 | Mistry et al. |
| 9,575,560 B2 | 2/2017 | Poupyrev et al. |
| 9,588,625 B2 | 3/2017 | Poupyrev, IV |
| 9,594,443 B2 | 3/2017 | Vanblon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,034,630 B2 | 7/2018 | Lee et al. |
| 10,073,590 B2 | 9/2018 | Dascola et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |

(56) References Cited

U.S. PATENT DOCUMENTS

| | | |
|---|---|---|
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 10,459,080 B1 | 10/2019 | Schwesig et al. |
| 10,492,302 B2 | 11/2019 | Karagozler et al. |
| 10,496,182 B2 | 12/2019 | Lien et al. |
| 10,503,883 B1 | 12/2019 | Gillian et al. |
| 10,509,478 B2 | 12/2019 | Poupyrev et al. |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1* | 12/2005 | Murashita ............ G01S 7/52063 600/437 |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1* | 12/2006 | Zemany ................ G01S 13/888 342/22 |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2008/0002027 A1 | 1/2008 | Kondo et al. |
| 2008/0024438 A1 | 1/2008 | Collins et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder et al. |
| 2009/0226043 A1 | 9/2009 | Angell et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0050133 A1 | 2/2010 | Nishihara et al. |
| 2010/0053151 A1 | 3/2010 | Marti et al. |
| 2010/0065320 A1 | 3/2010 | Urano |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0198067 A1 | 8/2010 | Mahfouz et al. |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0306713 A1 | 12/2010 | Geisner et al. |
| 2010/0313414 A1 | 12/2010 | Sheats |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0166940 A1 | 7/2011 | Bangera et al. |
| 2011/0181509 A1* | 7/2011 | Rautiainen .............. G06F 3/017 345/158 |
| 2011/0181510 A1* | 7/2011 | Hakala .................... G06F 3/017 345/158 |
| 2011/0197263 A1 | 8/2011 | Stinson, III |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1* | 11/2012 | Wang ...................... G06F 3/017 345/156 |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0046544 A1 | 2/2013 | Kay et al. |

(56) References Cited

U.S. PATENT DOCUMENTS

| | | |
|---|---|---|
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |
| 2013/0241765 A1 | 9/2013 | Kozma et al. |
| 2013/0245986 A1 | 9/2013 | Grokop et al. |
| 2013/0249793 A1 | 9/2013 | Zhu et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1* | 10/2014 | Xie ........................ G06F 3/017 707/748 |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368441 A1 | 12/2014 | Touloumtzis |
| 2015/0002391 A1 | 1/2015 | Chen |
| 2015/0009096 A1 | 1/2015 | Lee et al. |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0095987 A1 | 4/2015 | Potash et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Wang et al. |
| 2015/0185314 A1 | 7/2015 | Corcos et al. |
| 2015/0199045 A1 | 7/2015 | Robucci et al. |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0346820 A1 | 12/2015 | Poupyrev et al. |
| 2015/0350902 A1 | 12/2015 | Baxley et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1* | 5/2016 | Rao ........................ G01S 13/343 342/59 |
| 2016/0170491 A1 | 6/2016 | Jung |
| 2016/0171293 A1 | 6/2016 | Li et al. |
| 2016/0186366 A1 | 6/2016 | McMaster |
| 2016/0216825 A1 | 7/2016 | Forutanpour |
| 2016/0249698 A1 | 9/2016 | Berzowska et al. |
| 2016/0252607 A1 | 9/2016 | Saboo et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |

(56) References Cited

U.S. PATENT DOCUMENTS

| | | |
|---|---|---|
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | Debusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0192523 A1 | 7/2017 | Poupyrev |
| 2017/0196513 A1 | 7/2017 | Longinotti-Buitoni et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329425 A1 | 11/2017 | Karagozler et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0160943 A1 | 6/2018 | Fyfe et al. |
| 2018/0196527 A1 | 7/2018 | Poupyrev et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |
| 2019/0391667 A1 | 12/2019 | Poupyrev |
| 2019/0394884 A1 | 12/2019 | Karagozler et al. |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| GB | 2070469 | 9/1981 |
| GB | 2443208 | 4/2008 |
| JP | 2003280049 | 10/2003 |
| JP | 2006234716 | 9/2006 |
| JP | 2011102457 | 5/2011 |
| WO | WO-9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004053601 | 6/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2013192166 | 12/2013 |
| WO | WO-2014019085 | 2/2014 |
| WO | WO-2014116968 | 7/2014 |
| WO | WO-2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2015149049 | 10/2015 |
| WO | 2016053624 | 4/2016 |
| WO | 20170200949 | 11/2017 |
| WO | 2018106306 | 6/2018 |

OTHER PUBLICATIONS

"Advisory Action", U.S. Appl. No. 14/504,139, dated Aug. 28, 2017, 3 pages.

"Final Office Action", U.S. Appl. No. 14/959,901, dated Aug. 25, 2017, 19 pages.

"Final Office Action", U.S. Appl. No. 15/403,066, dated Oct. 5, 2017, 31 pages.

"Non-Final Office Action", U.S. Appl. No. 15/093,533, dated Aug. 24, 2017, 18 pages.

"Non-Final Office Action", U.S. Appl. No. 15/142,619, dated Aug. 25, 2017, 16 pages.

"Non-Final Office Action", U.S. Appl. No. 14/959,799, dated Sep. 8, 2017, 16 pages.

"Non-Final Office Action", U.S. Appl. No. 15/398,147, dated Sep. 8, 2017, 7 pages.

"Non-Final Office Action", U.S. Appl. No. 14/518,863, dated Sep. 29, 2017, 20 pages.

"Non-Final Office Action", U.S. Appl. No. 15/142,689, dated Oct. 4, 2017, 18 pages.

"Pre-Interview Office Action", U.S. Appl. No. 14/862,409, dated Sep. 15, 2017, 16 pages.

"Written Opinion", PCT Application No. PCT/US2017/032733, dated Jul. 26, 2017, 5 pages.

"Final Office Action", U.S. Appl. No. 14/518,863, dated Apr. 5, 2018, 21 pages.

"Final Office Action", U.S. Appl. No. 14/504,139, dated May 1, 2018, 14 pages.

"Final Office Action", U.S. Appl. No. 15/595,649, dated May 23, 2018, 13 pages.

"Final Office Action", U.S. Appl. No. 15/142,689, dated Jun. 1, 2018, 16 pages.

"Final Office Action", U.S. Appl. No. 14/874,955, dated Jun. 11, 2018, 9 pages.

"Final Office Action", U.S. Appl. No. 14/959,901, dated Jun. 15, 2018, 21 pages.

"Final Office Action", U.S. Appl. No. 15/286,152, dated Jun. 26, 2018, 25 pages.

"Final Office Action", U.S. Appl. No. 15/267,181, dated Jun. 7, 2018, 31 pages.

"First Action Interview Office Action", U.S. Appl. No. 15/166,198, dated Apr. 25, 2018, 8 pages.

"Foreign Office Action", Chinese Application No. 201721290290.3, dated Jun. 6, 2018, 3 pages.

"Non-Final Office Action", U.S. Appl. No. 15/287,253, dated Apr. 5, 2018, 17 pages.

"Non-Final Office Action", U.S. Appl. No. 15/586,174, dated Jun. 18, 2018, 7 pages.

"Notice of Allowance", U.S. Appl. No. 14/862,409, dated Jun. 6, 2018, 7 pages.

(56) References Cited

OTHER PUBLICATIONS

"Pre-Interview Communication", U.S. Appl. No. 15/362,359, dated May 17, 2018, 4 pages.
"Written Opinion", PCT Application No. PCT/US2017/032733, dated Jul. 24, 2017, 5 pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Corrected Notice of Allowance", U.S. Appl. No. 15/362,359, dated Sep. 17, 2018, 10 pages.
"Final Office Action", U.S. Appl. No. 14/504,121, dated Jul. 9, 2018, 23 pages.
"Final Office Action", U.S. Appl. No. 15/166,198, dated Sep. 27, 2018, 33 pages.
"Non-Final Office Action", U.S. Appl. No. 15/287,253, dated Sep. 7, 2018, 20 pages.
"Non-Final Office Action", U.S. Appl. No. 14/504,139, dated Oct. 5, 2018, 16 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/874,955, dated Oct. 4, 2018, 8 pages.
"Notice of Allowance", U.S. Appl. No. 15/142,619, dated Aug. 13, 2018, 9 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Final Office Action", U.S. Appl. No. 15/286,512, dated Dec. 26, 2018, 15 pages.
"International Preliminary Report on Patentability", PCT Application No. PCT/US2017/032733, dated Nov. 29, 2018, 7 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Notice of Allowance", U.S. Appl. No. 15/595,649, dated Jan. 3, 2019, 5 pages.
"Notice of Allowance", U.S. Appl. No. 15/142,689, dated Oct. 30, 2018, 9 pages.
"Notice of Allowance", U.S. Appl. No. 15/287,200, dated Nov. 6, 2018, 19 pages.
"Restriction Requirement", U.S. Appl. No. 15/462,957, dated Jan. 4, 2019, 6 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017 , 7 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.

(56) References Cited

OTHER PUBLICATIONS

"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Pre-Interview Communication", U.S. Appl. No. 14/959,901, dated Feb. 10, 2017, 3 pages.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.
"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Notice of Publication", U.S. Appl. No. 15/703,511, dated Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, US, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 pages.
"Final Office Action", U.S. Appl. No. 15/287,308, dated Feb. 8, 2019, 23 pages.
"Final Office Action", U.S. Appl. No. 15/287,253, dated Apr. 2, 2019, 10 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Notice of Allowance", U.S. Appl. No. 15/286,495, dated Jan. 17, 2019, 5 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Notice of Allowance", U.S. Appl. No. 15/286,152, dated Mar. 5, 2019, 23 pages.
"Notice of Allowance", U.S. Appl. No. 15/286,837, dated Mar. 6, 2019, 7 pages.
"Notice of Allowance", U.S. Appl. No. 15/286,512, dated Apr. 9, 2019, 14 pages.
"Pre-Interview Communication", U.S. Appl. No. 15/703,511, dated Feb. 11, 2019, 5 pages.
"Restriction Requirement", U.S. Appl. No. 15/352,194, dated Feb. 6, 2019, 8 pages.
Garmatyuk, et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.
Seisheimer, et al., "A Continuous-Wave (CW) Radar for Gait Analysis", IEEE 2001, 2001, 5 pages.
"Cardiio", Retrieved from: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
"Corrected Notice of Allowance", U.S. Appl. No. 14/312,486, dated Jan. 23, 2017, 4 pages.
"Corrected Notice of Allowance", U.S. Appl. No. 14/312,486, dated Oct. 28, 2016, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Dec. 19, 2016, 2 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.

(56) References Cited

OTHER PUBLICATIONS

"International Search Report and Written Opinion", Application No. PCT/US2016/024289, dated Aug. 25, 2016, 17 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"International Search Report and Written Opinion", Application No. PCT/US2016/033342, dated Oct. 27, 2016, 20 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/518,863, dated Oct. 14, 2016, 16 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Non-Final Office Action", U.S. Appl. No. 14/959,799, dated Jan. 27, 2017, 10 pages.
"Notice of Allowance", U.S. Appl. No. 14/312,486, dated Oct. 7, 2016, 15 pages.
"Notice of Allowance", U.S. Appl. No. 14/504,061, dated Sep. 12, 2016, 7 pages.
"Notice of Allowance", U.S. Appl. No. 14/582,896, dated Nov. 7, 2016, 5 pages.
"Notice of Allowance", U.S. Appl. No. 14/930,220, dated Feb. 2, 2017, 8 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 14/494,863, dated Jan. 27, 2017, 5 pages.
"Pre-Interview Communication", U.S. Appl. No. 14/513,875, dated Oct. 21, 2016, 3 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Cheng,"Smart Textiles: From Niche to Mainstream", IEEE Pervasive Computing, Jul. 2013, pp. 81-84.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Farringdon,"Wearable Sensor Badge & Sensor Jacket for Context Awareness", Third International Symposium on Wearable Computers, Oct. 1999, 7 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Matthews,"Venous Pulse", Retrieved at: http://www.rjmatthewsmd.com/Definitions/venous_pulse.htm—on Nov. 30, 2016, Apr. 13, 2013, 7 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu,"Gesture Recognition Using Wireless Signals", Oct. 2014, pp. 15-18.
Pu,"Whole-Home Gesture Recognition Using Wireless Signals", MobiCom '13 Proceedings of the 19th annual international conference on Mobile computing & networking, Aug. 27, 2013, 12 pages.
Schneegass,"Towards a Garment OS: Supporting Application Development for Smart Garments", Wearable Computers, ACM, Sep. 2014, 6 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 14/959,901, dated May 30, 2019, 18 pages.
"Final Office Action", U.S. Appl. No. 16/238,464, dated Jul. 25, 2019, 15 pages.
"First Action Interview Office Action", U.S. Appl. No. 15/917,238, dated Jun. 6, 2019, 6 pages.

(56) References Cited

OTHER PUBLICATIONS

"International Preliminary Report on Patentability", PCT Application No. PCT/US2017/051663, dated Jun. 20, 2019, 10 pages.
"Non-Final Office Action", U.S. Appl. No. 15/462,957, dated May 24, 2019, 14 pages.
"Notice of Allowance", U.S. Appl. No. 15/287,308, dated Jul. 17, 2019, 17 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 15/703,511, dated Apr. 16, 2019, 5 pages.
"Notice of Allowance", U.S. Appl. No. 15/352,194, dated Jun. 26, 2019, 8 pages.
"Notice of Allowance", U.S. Appl. No. 15/287,155, dated Jul. 25, 2019, 7 pages.
"Pre-Interview Communication", U.S. Appl. No. 15/917,238, dated May 1, 2019, 6 pages.
"EP Appeal Decision", European Application No. 10194359.5, May 28, 2019, 20 pages.
"Final Office Action", U.S. Appl. No. 15/287,394, Sep. 30, 2019, 38 Pages.
"Final Office Action", U.S. Appl. No. 15/462,957, Nov. 8, 2019, 10 Pages.
"Galaxy S4 Air Gesture", Galaxy S4 Guides, https://allaboutgalaxys4.com/galaxy-s4-features-explained/air-gesturef, 4 pages.
"Non-Final Office Action", U.S. Appl. No. 15/286,537, Sep. 3, 2019, 28 Pages.
"Non-Final Office Action", U.S. Appl. No. 15/791,044, Sep. 30, 2019, 22 Pages.
"Non-Final Office Action", U.S. Appl. No. 16/153,395, Oct. 22, 2019, 10 Pages.
"Notice of Allowance", U.S. Appl. No. 16/356,748, Oct. 17, 2019, 9 Pages.
"Notice of Allowance", U.S. Appl. No. 16/238,464, Nov. 4, 2019, 10 Pages.
"Samsung Galaxy S4 Air Gestures", Video from https://www.youtube.com/watch?v=375Hb87yGcg, May 7, 2013.
Amihood, et al., "Closed-Loop Manufacturing System Using Radar", Technical Disclosure Commons; Retrieved from http://www.tdcommons.org/dpubs_series/464, Apr. 17, 2017, 8 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
"Non-Final Office Action", U.S. Appl. No. 16/252,477, Jan. 10, 2020, 13 Pages.

\* cited by examiner

CONCURRENT DETECTION OF ABSOLUTE DISTANCE AND RELATIVE MOVEMENT FOR SENSING ACTION GESTURES

PRIORITY

This application claims priority to U.S. Provisional Patent Application Ser. No. 62/430,276 filed on Dec. 5, 2016, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

To interact or control the functionality of a computer, a user oftentimes enters input using various types of input devices. As one example, a hand-held or attachable detection device can sometimes be physically coupled to a hand performing a gesture as a way to capture velocity or directional movement information about the gesture. In turn, this attachable device communicates with the computer to provide input from the user. However, the user must first locate the detection device, then attach or hold it appropriately in order to capture the desired characteristics of the gesture properly. This can be inconvenient or problematic when the user cannot locate the detection device, or introduce errors if the user does not attach the device properly. An alternative to physically coupling a detection device to a hand performing an in-the-air gesture is wireless detection. A challenge in wireless detection pertains to the complexity, size, and/or cost of hardware, in that they can constrain or limit what types of devices can incorporate wireless gesture detection. For example, Frequency Modulated Continuous Wave (FMCW) radar detection uses signals over a wide bandwidth. These wide bandwidth operating conditions utilize hardware that is complex and sizable, thus making FMCW radar detection inappropriate or unviable for use in portable devices (e.g., a smart watch or mobile phone).

SUMMARY

This Summary is provided to introduce a selection of concepts in a simplified form that are further described below in the Detailed Description. This Summary is not intended to identify limiting features of the claimed subject matter.

A gesture detection system uses two radar tones to concurrently detect absolute distance and relative movement of a target object. A radar-based detection device alternates transmitting a first radar tone and a second radar tone via a radar-emitting device, and then captures a first return signal and a second return signal which are generated by the first radar tone and second radar tone reflecting off the target object. The radar-based detection device demodulates the return signals into a first set of quadrature signals and a second set of quadrature signals and, in some cases, generates a first set of digital samples and second set of digital samples from the respective quadrature signals. Various aspects process the first set of digital samples and second set of digital samples to concurrently identify absolute distance and relative movement and, at times, determine an in-the-air gesture performed by the target object.

BRIEF DESCRIPTION OF THE DRAWINGS

Various aspects of absolute distance and relative movement detection via a two-tone radar gesture detection system are described with reference to the following drawings. The same numbers are used throughout the drawings to reference like features and components.

DETAILED DESCRIPTION

Overview

Two-tone radar detection systems provide a compact and affordable gesture detection system relative wideband radar detection systems. A radar-based detection device alternates between transmitting a first radar tone and transmitting a second radar tone via a radar-emitting device. At times, the radar-based detection device uses a single radar-emitting device, and reconfigures the radar-emitting device to alternate between transmitting the first radar tone and the second radar tone. Upon transmitting the first radar tone, the radar-based detection device captures a first return signal, and, upon transmitting the second radar tone, captures a second return signal, where the return signals are generated by the first radar tone and second radar tone reflecting off the target object, respectively. The radar-based detection device demodulates the first and second return signals into a first set of quadrature signals and a second set of quadrature signals, respectively. In some cases, the radar-based detection device digitizes the quadrature signals to generate a first set of digital samples and second set of digital samples, respectively. Various aspects extract phase offset and/or phase difference information from the quadrature signals to concurrently identify absolute distance and relative movement, such as by applying digital signal processing to the first set of digital samples and second set of digital samples. Upon determining absolute distance and relative movement, the two-tone radar-based detection device can determine an in-the-air gesture performed by the target object.

In the following discussion, an example environment is first described in which various aspects can be employed. Following this is a discussion of example radio frequency (RF) signal propagation properties and how they can be employed for in-the-air gesture detection. After this, absolute distance and relative movement detection via a two-tone gesture detection system is described. Finally, an example device is described in which two-tone radar-based gesture detection systems can be employed.

Example Environment

Figure 1:
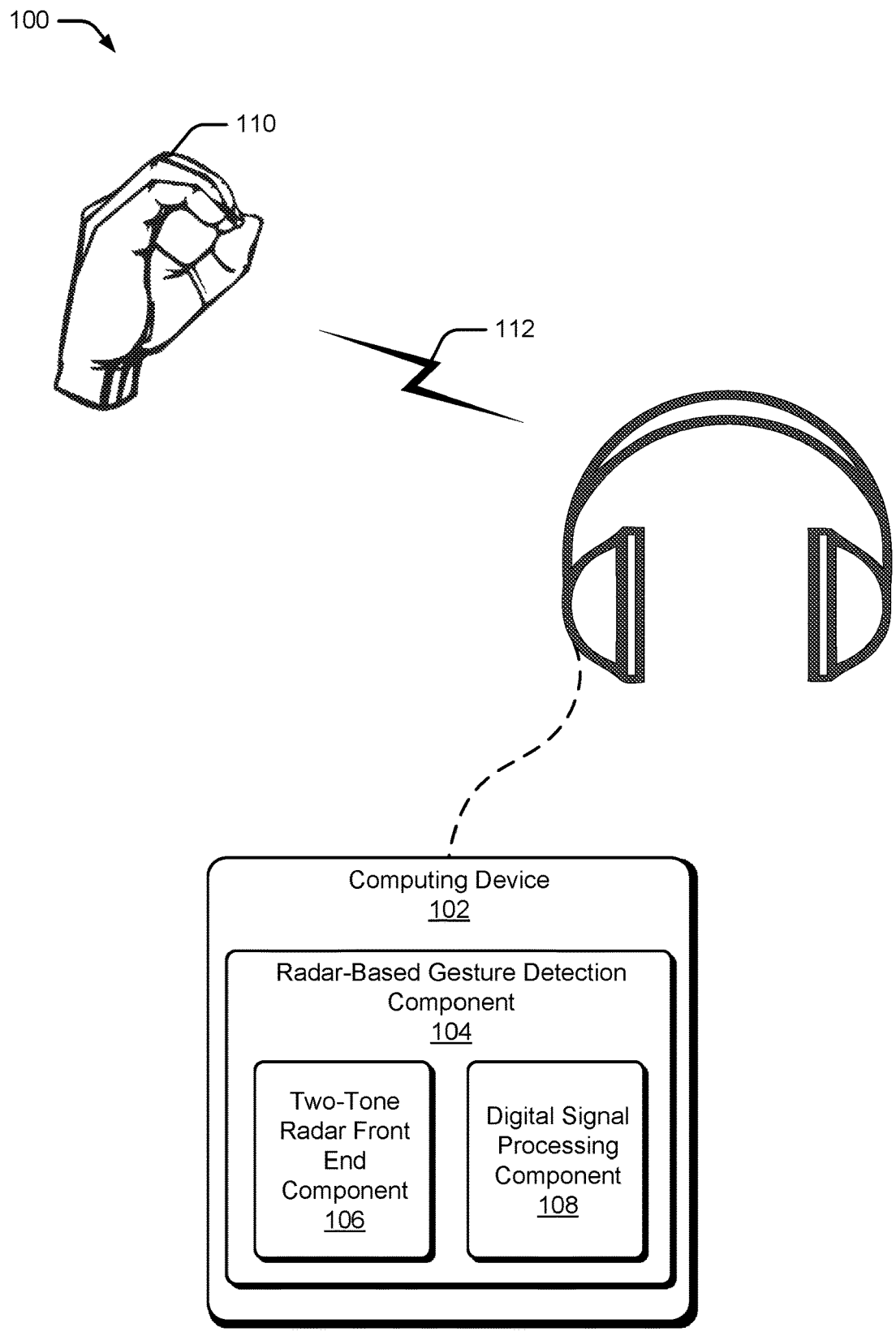
FIG. 1 illustrates an example environment that employs two-tone radar detection of gestures in accordance with one or more embodiments.

FIG. 1 illustrates example environment 100 in which a two-tone radar detection system can be employed to detect in-the-air gestures. Example environment 100 includes computing device 102 which is capable of wirelessly sensing, detecting, and recognizing gestures by way of radar-based gesture detection component 104. Here, computing device 102 assumes the form of a portable wireless headset that outputs an audio stream via speakers. To receive input commands from a user, computing device 102 (via radar-based gesture detection component 104) detects in-the-air gestures using radar. For instance, a user can perform various in-the-air gestures to increase or decrease an audio volume, skip a current audio track being played, pause audio playback, and so forth. At times, the computing device utilizes a two-tone radar gesture detection system to detect and identify these input gestures.

Radar-based gesture detection component 104 represents functionality that identifies characteristics of a target object using radar, such as a hand performing an in-the-air gesture. Sometimes radar-based gesture detection component 104 not only identifies characteristics about a target object and/or gesture, but also identifies a specific gesture (e.g., a single-tap gesture, a double-tap gesture, a left-swipe, a forward-swipe, a right-swipe, a finger making a shape). In some cases, radar-based gesture detection component 104 captures enough resolution in the characteristics to distinguish a micro-gesture from other gestures, where micro-gestures contain differences measurable on a scale of millimeters (mm) to sub-millimeters (sub-mm). In order to identify different types of gestures and their corresponding characteristics, the computing device sometimes determines absolute distance and relative movement of the target object using a two-tone radar gesture detection system. The use of phrase "absolute distance" indicates a fixed distance or fixed point, rather than an absolute or exact real-world value, while the phrase "relative movement" indicates movement around that fixed distance or fixed point. However, in real-world applications, a measurement or estimate that determines an "absolute distance" or "relative movement" can include some error in that value that deviates from the exact value.

Radar-based gesture detection component 104 includes two-tone radar front-end component 106 for transmission and reception of various RF signals. As part of the detection process, the two-tone radar front-end component emits or transmits two carrier frequency tones that propagate towards a target of interest. These tones can be transmitted simultaneously, or alternately where the radar-based gesture detection component 104 configures and/or reconfigures a signal source to control which tone is transmitted, when to alternate between the two tones, what duration each tone is transmitted for, etc. As the transmitted tones reflect off the target of interest, signal reflections propagate back towards computing device 102 and are received via an antenna and receiver system of two-tone radar front-end component 106. Any suitable type of receiver system can be used. In some cases, two-tone radar front-end component 106 includes a homodyne receiver system to demodulate the received signals to baseband quadrature signals (I and Q component signals). The two-tone radar front-end component then routes the demodulated baseband signals to digital signal processing (DSP) component 108 for digitization and analysis.

Digital signal processing component 108 generally represents functionality that converts an analog signal into a digital representation, and processes the digital representations to extract any desired information. For example, digital signal processing component 108 can include two synchronized analog-to-digital converters (ADCs) to sample the baseband quadrature signals generated by the front-end component (e.g., a first ADC for the I-component of the received signal, a second ADC for the Q-component of the received signal). Upon digitizing the quadrature signals, digital signal processing component 108 processes the samples to extract absolute distance and relative movement information about the target object from which the signal reflected. Sometimes the digital signal processing component digitally extract phase offset and/or phase difference information, which is then used to determine absolute distance and relative movement, as further described herein.

Hand 110 represents a hand of a user that radar-based gesture detection component 104 is in process of detecting. Here, hand 110 resides in free-space and has no physical devices attached to it that couple to, or communicate with, computing device 102 and/or radar-based gesture detection component 104. As hand 110 performs a gesture, the radar-based gesture detection component uses its two-tone radar detection system to wirelessly identify corresponding characteristics of the gesture.

Signals 112 generally represent two RF signals transmitted and received by radar-based gesture detection component 104. For the purposes of this discussion, signals 112 are interchangeably referred to as RF signals, carrier frequency signals, carrier frequency radar tones, carrier frequency tones, and/or radar tones. In some cases, radar-based gesture detection component 104 emits each RF signal and/or radar tone on a same antenna that is directed towards hand 110. Other times, each RF signal and/or radar tone is transmitted on a respective antenna. These RF signals can be transmitted simultaneously, or alternately. As a transmitted signal reaches hand 110, at least a portion reflects back to radar-based gesture detection component 104 and is processed, as further described herein. Signals 112 can have any suitable combination of energy level, carrier frequency, burst periodicity, pulse width, modulation type, waveform, phase relationship, and so forth. The configuration of signals 112, as well as how reflected signals are processed, can be regulated by radar-based gesture detection component 104.

Figure 2:
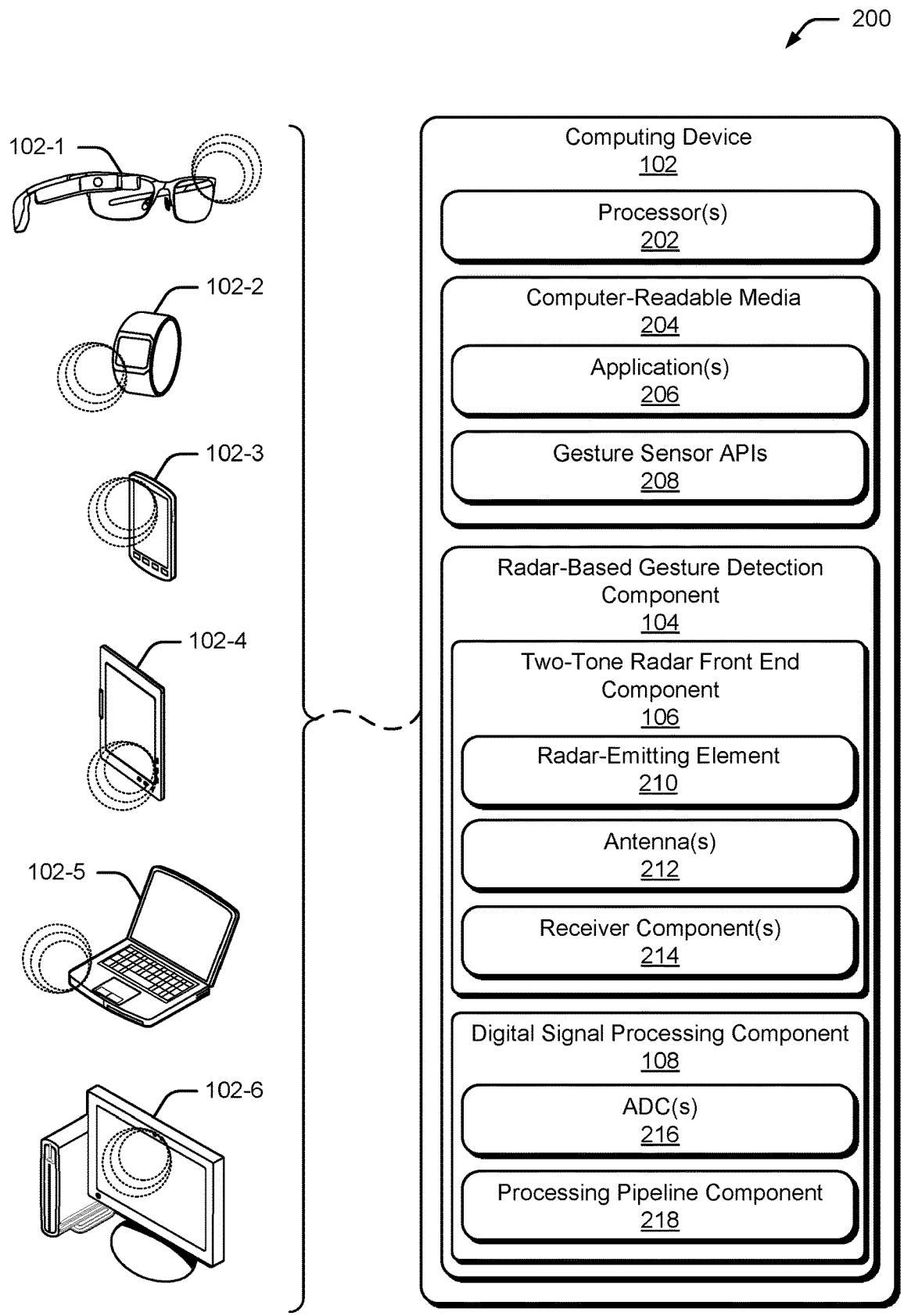
FIG. 2 illustrates an example implementation of a computing device of FIG. 1 in greater detail in accordance with one or more embodiments.

Having generally described an environment in which a two-tone radar-based gesture detection system may be implemented, now consider FIG. 2, which illustrates an example implementation of computing device 102 of FIG. 1 in greater detail. Computing device 102 represents any suitable type of computing device which can utilize a two-tone radar-based gesture detection system. In this example, various devices include, by way of example and not limitation: smart glasses 102-1, smart watch 102-2, mobile phone 102-3, tablet 102-4, laptop 102-5, and display monitor 102-6. It is to be appreciated that these are merely examples for illustrative purposes, and that any other suitable type of computing device can be utilized without departing from the scope of the claimed subject matter, such as a gaming console, a lighting system, an audio system, a refrigerator, a microwave, etc.

Computing device 102 includes processor(s) 202 and computer-readable storage media 204. Applications 206 and/or an operating system (not shown) embodied as computer-readable instructions on the computer-readable storage media 204 can be executed by the processor(s) 202 to invoke or interface with some or all of the functionalities described herein, such as through gesture sensor Application Programming Interfaces (APIs) 208. In some cases, applications 206 receives input and or a notification (via APIs 208) from radar-based gesture detection component 104 when an in-the-air gesture has been detected. Other times, an application determines and/or sets various operating parameters of radar-based gesture detection component 104 by utilizing gesture sensor APIs 208 to send commands and receive back information, such as algorithm selection, signal configuration, and so forth.

Gesture sensor APIs 208 provide programming access into various routines and functionality incorporated into radar-based gesture detection component 104. For instance, radar-based gesture detection component 104 can have a programmatic interface (socket connection, shared memory, read/write registers, hardware interrupts, etc.) that can be used in concert with gesture sensor APIs 208 to allow applications 206 to communicate with and/or configure radar-based gesture detection component 104. At times, gesture sensor APIs 208 provide high-level access into radar-based gesture detection component 104 in order to abstract implementation details and/or hardware access from a calling program, request notifications related to identified events, query for results, and so forth. Gesture sensor APIs 208 can also provide low-level access to radar-based gesture detection component 104, where a calling program can control a hardware configuration of radar-based gesture detection component 104 and/or configuration of the RF signals and/or tones transmitted.

At times, radar-based gesture detection component 104 can be implemented as a chip embedded within computing device 102, such as a System-on-Chip (SoC). However, it is to be appreciated that the radar-based gesture detection component can be implemented in any other suitable manner, such as one or more Integrated Circuits (ICs), as a processor with embedded processor instructions or configured to access processor instructions stored in memory, as hardware with embedded firmware, a printed circuit board with various hardware components, software, firmware, or any combination thereof. Here, radar-based gesture detection component 104 includes two-tone radar front-end component 106 and digital signal processing component 108 that can be used in concert to wirelessly detect characteristics of target objects using two-tone radar techniques as described herein.

Two-tone radar front-end component 106 includes radar emitting element 210, antennas 212, and receiver components 214. Generally, radar-emitting element 210 represents a signal generator configured to emit radar signals. In some aspects, radar-emitting element 210 emits two radar signals and/or carrier frequency tones, (e.g., $f_1$ and $f_2$), either simultaneously or alternately, that are configured to at least partially reflect off a target object. At times, the radar signals penetrate fabric or other obstructions and reflect from human tissue. These fabrics or obstructions can include wood, glass, plastic, cotton, wool, nylon and similar fibers, and so forth, while reflecting from human tissues, such as a person's hand. The selection of the radar signals can be performed in any suitable manner. For example, sometimes a two-tone radar front-end component selects the carrier frequency tones based upon a desired signal-to-noise ratio (SNR). Other times, two-tone radar front-end component receives information via a programmatic interface (e.g., gesture sensor APIs 208) that is used to determine and/or set the RF signals and/or radar tones.

Antenna(s) 212 transmit and receive RF signals. In some cases, radar-emitting element 210 is electrically coupled to antenna(s) 212 as a way to transmit a radar field. As one skilled in the art will appreciate, this is achieved by converting electrical signals into electromagnetic waves for transmission, and vice versa for reception. Radar-based gesture detection component 104 can include any suitable number of antennas in any suitable configuration. For instance, any of the antennas can be configured as a dipole antenna, a parabolic antenna, a helical antenna, a monopole antenna, and so forth. At times, antenna(s) 212 are constructed on-chip (e.g., as part of an SoC), while other times, antenna(s) 212 are separate components, metal, hardware, etc. that attach to, or are included within, radar-based gesture detection component 104. An antenna can be single-purpose (e.g., a first antenna directed towards transmitting signals, a second antenna directed towards receiving signals, etc.), or multi-purpose (e.g., an antenna is directed towards transmitting and receiving signals). The placement, size, and/or shape of antenna(s) 212 can be chosen to enhance a specific transmission pattern or diversity scheme, such as a pattern or scheme designed to capture information about a micro-gesture performed by the hand. While not illustrated, each antenna can correspond to a respective transceiver path that physically routes and manages the outgoing RF signals for transmission and the incoming RF signals for capture and analysis.

A radar field can be a small size, such as 0 or 1 millimeters to 1.5 meters, or an intermediate size, such as 1 to 30 meters. It is to be appreciated that these sizes are merely for discussion purposes, and that any other suitable range can be used. When the radar field has an intermediate size, radar-based gesture detection component 104 is configured to receive and process reflections of the radar field to provide large-body gestures based on reflections from human tissue caused by body, arm, or leg movements. In other cases, the radar field can be configured to enable radar-based gesture detection component 104 to detect smaller and more-precise gestures, such as micro-gestures that are distinguishable from one another based upon differences that can be detected in the millimeter range. Example intermediate-sized radar fields include those in which a user makes gestures to control a television from a couch, change a song or volume from a stereo across a room, turn off an oven or oven timer (a near field would also be useful here), turn lights on or off in a room, and so forth. Radar-emitting element 210 can be configured to emit carrier frequency tones, continuously modulated radiation, ultra-wideband radiation, or sub-millimeter-frequency radiation.

Receiver components 214 generally represent hardware components configured to convert electromagnetic signals propagating through the air, and subsequently captured by antennas 212, into an electronic (analog) signal that is simpler to use or process than higher frequencies. While an antenna converts a propagating waveform into the electronic signal, receiver components 214 convert the electronic signal into baseband, or baseband quadrature, signals, whose lower frequencies are simpler to process than a frequency associated with the propagating or captured signal. Some aspects implement receiver components 214 as a direct-conversion homodyne receiver with quadrature detection. Relative to other receiver systems (such as a super-heterodyne receiver), the direct-conversion homodyne receiver utilizes less down conversion stages, which simplifies the hardware in cost, size, and analog signal processing. However, this simplification sometimes introduces technical challenges in reproducing the received signal accurately. By converting the signals into baseband quadrature signals via a direct-conversion homodyne receiver, various aspects compensate for inaccuracies introduced by the simper hardware by sampling the baseband quadrature signals to generate a set of quadrature digital samples, which are then processed in the digital domain. In turn, this can reliable results, since various aspects of digital processing yield more accurate results in estimating information from a signal than analog counterparts.

Digital signal processing component 108 includes ADCs 216 and processing pipeline component 218. ADC's 216 capture an analog signal at discrete points in time to generate digital samples that represent the signal at each respective (discrete) point in time. At times, digital signal processing component 108 includes two ADCs: a first ADC to capture digital samples of an I-component of a baseband quadrature signal; and a second ADC to capture digital samples of a Q-component of the baseband quadrature signal, where the ADCs are synchronized to capture the I-component and Q-component at a same point in time. After capturing the digital samples, digital signal processing component 108 then passes the samples to processing pipeline component 218.

Processing pipeline component 218 processes digital samples to extract any suitable type of desired information, such as absolute distance and relative movement detection, specific micro-gesture identification, etc. In some cases, extracting the desired information occurs in multiple stages, such as through the stages of a pipeline. For example, processing pipeline component can utilize a digital signal processing stage to perform basic classification of a target object (e.g., velocity information, directional movement information, presence, shape, size, orientation), which is then used in a machine learning stage to extract features about the target object which are then used to identify in-the-air gestures (e.g., finger tapping, swipe movements, an eye blink, mouthing a word, a head-shake). This can be achieved in any suitable manner, such as through the use of a library that includes various digital signal processing algorithms and machine learning algorithms to determine how to process the information or digital samples at that respective stage. In some cases, the applied algorithm can be selected through the use of gesture sensor APIs 208, while in others the applied algorithm can be selected by default. Other times, processing pipeline component 218 can send a notification via a programming interface (e.g., gesture sensor APIs 208) when a particular gesture has been identified. Processing pipeline component 218 can be implemented in hardware, software, firmware, or any combination thereof.

Having described computing device 102 in accordance with various aspects, now consider a discussion of RF signal propagation that can be utilized in accordance with various radar-based detection devices.

RF Signal Propagation in Radar-Based Detection Devices

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Hand gestures provide a user with a simple and readily available mechanism to input commands to a computing device. However, detecting hand gestures can pose certain problems. For example, attaching a movement sensing device to a hand does not remove a user's dependency upon a peripheral device. Instead, it is a solution that trades one input peripheral for another. As an alternative, cameras can capture images, which can then be compared and analyzed to identify the hand gestures. However, cameras can only detect what is visible, and lack the ability to penetrate clothing, wood, plastics, and so forth. Cameras also may not yield a fine enough resolution to detect micro-gestures. An alternate solution involves usage of radar systems to transmit a radar field to a target object, and determine information about that target based upon an analysis of the reflected signal.

Figure 3:
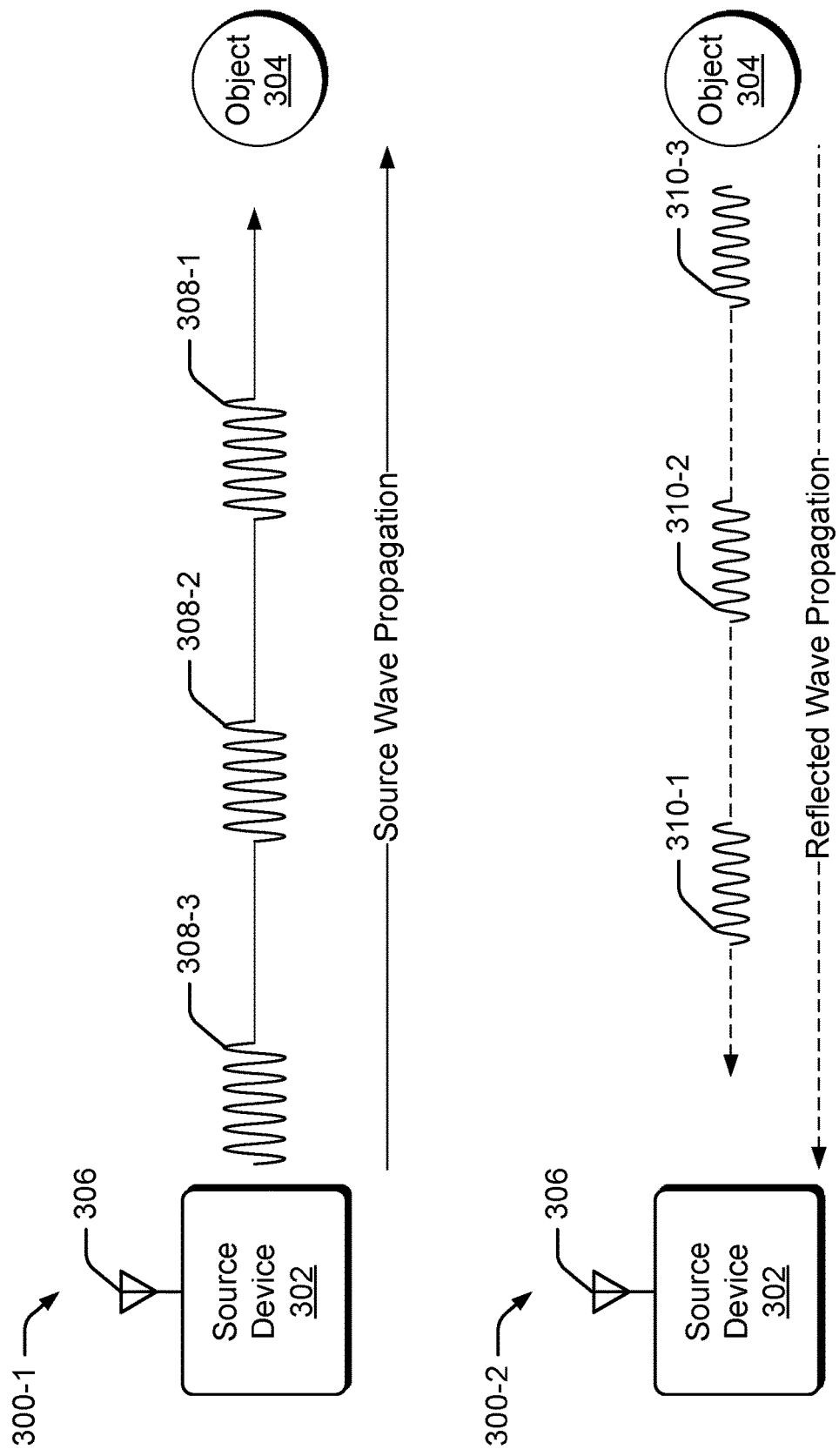
FIG. 3 illustrates an example of general signal properties.

Consider FIG. 3 which illustrates a simple example of RF wave propagation, and a corresponding reflected wave propagation. It is to be appreciated that the following discussion has been simplified, and is not intended to describe all technical aspects of RF wave propagation, reflected wave propagation, or detection techniques.

Environment 300-1 includes source device 302 and object 304. Source device 302 includes antenna 306, which generally represents functionality configured to transmit and receive electromagnetic waves in the form of an RF signal. It is to be appreciated that antenna 306 can be coupled to a feed source, such as a radar-emitting element, to achieve transmission of a signal. In this example, source device 302 transmits a series of RF pulses, illustrated here as RF pulse 308-1, RF pulse 308-2, and RF pulse 308-3. As indicated by their ordering and distance from source device 302, RF pulse 308-1 is transmitted first in time, followed by RF pulse 308-2, and then RF pulse 308-3. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 300-2 illustrates the reflection of RF pulse 308-1, RF pulse 308-2, and RF pulse 308-3 reflecting off of object 304, where RF pulse 310-1 corresponds to a reflection originating from RF pulse 308-1 reflecting off of object 304, RF pulse 310-2 corresponds to a reflection originating from RF pulse 308-2, and so forth. In this simple case, source device 302 and object 304 are stationary, and RF pulse 308-1, RF pulse 308-2, and RF pulse 308-3 are transmitted via a single antenna (antenna 306) over a same RF channel, and are transmitted directly towards object 304 with a perpendicular impact angle. Similarly, RF pulse 310-1, RF pulse 310-2, and RF pulse 310-3 are shown as reflecting directly back to source device 302, rather than with some angular deviation. However, as one skilled in the art will appreciate, these signals can alternately be transmitted or reflected with variations in their transmission and reflection directions based upon the configuration of source device 302, object 304, transmission parameters, variations in real-world factors, and so forth.

Upon receiving and capturing, RF pulse 310-1, RF pulse 310-2, and RF pulse 310-3, source device 302 can then analyze the pulses, either individually or in combination, to identify characteristics related to object 304. For example, source device 302 can analyze all of the received RF pulses to obtain temporal information and/or spatial information about object 304. Accordingly, source device 302 can use knowledge about a transmission signal's configuration (such as pulse widths, spacing between pulses, pulse power levels, phase relationships, and so forth), and further analyze a reflected RF pulse to identify various characteristics about object 304, such as size, shape, movement speed, movement direction, surface smoothness, material composition, and so forth.

Figure 4:
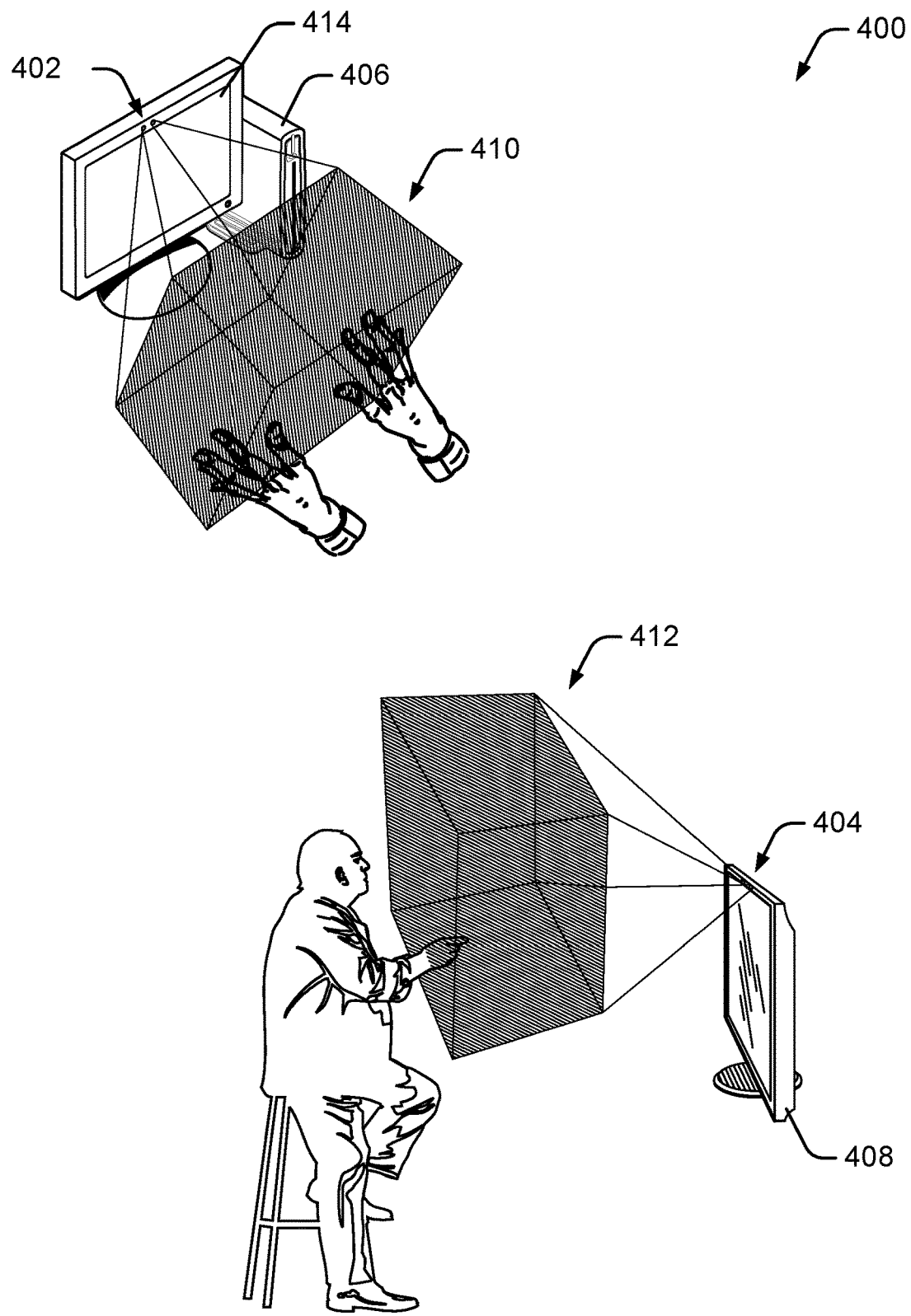
FIG. 4 illustrates an example environment that employs two-tone radar detection of gestures in accordance with one or more embodiments.

Now consider FIG. 4, which illustrates example environment 400 in which techniques using, and an apparatus including, a radar-based gesture recognition system may be embodied, such as radar-based gesture detection component 104 of FIG. 1. Environment 400 includes two example devices using a radar-based gesture detection system. In the first, radar-based gesture detection system 402 provides a near radar field to interact with desktop computer 406, and in the second, radar-based gesture detection system 404 provides an intermediate radar field (e.g., a room size) to interact with television 408. Radar-based gesture detection system 402 and radar-based gesture detection system 404 provide radar field 412 and intermediate radar field 412, respectively, and are described below.

Desktop computer 406 includes, or is associated with, radar-based gesture detection system 402. These devices work together to improve user interaction with desktop computer 406. Assume, for example, that desktop computer 406 includes a touch screen 414 through which display and user interaction can be performed. This touch screen 414 can present some challenges to users, such as needing a person to sit in a particular orientation, such as upright and forward, to be able to touch the screen. Further, the size for selecting controls through touch screen 414 can make interaction difficult and time-consuming for some users. Consider, however, radar-based gesture detection system 402, which provides near radar field 410 enabling a user's hands to interact with desktop computer 406, such as with small or large, simple or complex gestures, including those with one or two hands, and in three dimensions. As is readily apparent, a large volume through which a user may make selections can be substantially easier and provide a better experience over a flat surface, such as that of touch screen 414.

Similarly, consider radar-based gesture detection system 404, which provides intermediate radar field 412. Providing a radar-field enables a user to interact with television 408 from a distance and through various gestures, ranging from hand gestures, to arm gestures, to full-body gestures. By so doing, user selections can be made simpler and easier than a flat surface (e.g., touch screen 414), a remote control (e.g., a gaming or television remote), and other conventional control mechanisms.

Radar-based gesture recognition systems can interact with applications or an operating system of computing devices, or remotely through a communication network by transmitting input responsive to recognizing gestures. Gestures can be mapped to various applications and devices, thereby enabling control of many devices and applications. Many complex and specific gestures can be recognized by radar-based gesture recognition systems, thereby permitting precise and/or single-gesture control, even for multiple applications. Radar-based gesture recognition systems, whether integrated with a computing device, having computing capabilities, or having few computing abilities, can each be used to interact with various devices and applications.

Figure 5:
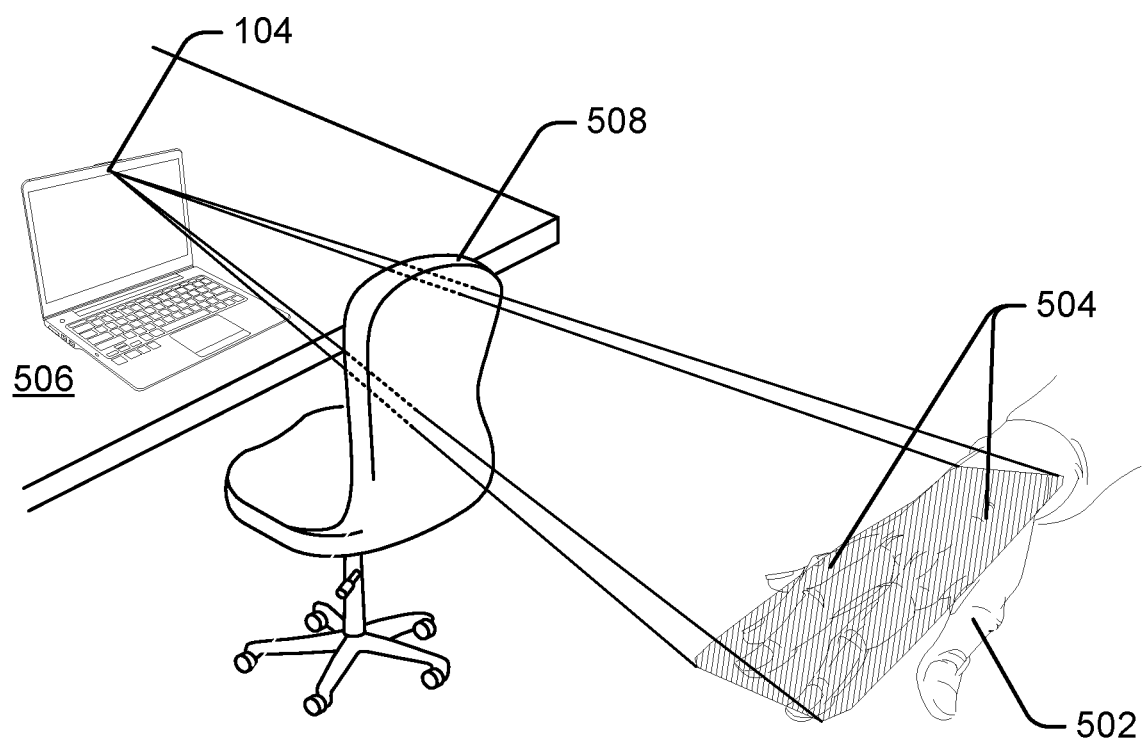
FIG. 5 illustrates an example environment that employs two-tone radar detection of gestures in accordance with one or more embodiments.

The radar field can also include a surface applied to human tissue. This is illustrated at FIG. 5, which shows hand 502 having a surface radar field 504 provided by radar-based gesture detection component 104 (of FIGS. 1 and 2) that is include in laptop 506. Radar-emitting element 210 (not shown) provides surface radar field 504 penetrating chair 508 and applied to hand 502. In this case, antenna(s) 212 (not shown) is configured to receive a reflection caused by an interaction on the surface of hand 502 that penetrates (e.g., reflects back through) chair 508. Similarly, digital signal processing component 108 (not shown) is configured to process the received reflection on the surface sufficient to provide gesture data usable to determine a gesture. Note that with surface radar field 504, another hand may interact to perform gestures, such as to tap on the surface on hand 502, thereby interacting with surface radar field 504. Example gestures include single and multi-finger swipe, spread, squeeze, non-linear movements, and so forth. Hand 502 may move or change shape to cause reflections, thereby also performing an occluded gesture.

Having described general principles of RF signals which can be used in radar-based detection devices, now consider a discussion of absolute distance detection via a two-tone radar detection system.

Two-Tone Radar Detection of Absolute Distance

Wireless detection of an input gesture allows a user to interact with a computing device without physically touching the computing device or an input device communicatively coupled to the computing device. This provides freedom to the user, in that an input gesture can be performed at any instant with a device the user is already in possession of (e.g., the hand, an eye, a tongue, etc.). The ability to distinguish micro-gestures from one another on a mm to sub-mm scale makes possible to use a small set of gestures to control a complex set of features. The relative movement and absolute distance of the gesture are types of characteristics that can be used to discern differences between micro-gestures.

Doppler radar can provide high accuracy in a displacement measurement (e.g., relative movement), but lacks the ranging capability for determining absolute distance. One form of a radar detection system that utilizes Doppler techniques, FMCW radar, builds a 2-dimensional (2D) range-Doppler map to determine range and/or absolute distance as a way to sense micro-Doppler features (e.g., discerning differences in gestures on a mm to sub-mm scale). However, the hardware implementations of a FMCW radar system can be a barrier to integrating such a system in to smaller devices, such as wearable devices or mobile devices. For instance, the Chirp signal in the FMCW radar system utilizes a signal source such as a Phased Locked Loop (PLL) to linearly sweep over a wide range of frequencies. This not only complicates the hardware incorporated into the corresponding radar system, but also brings potential issues in the resultant signal, such as linearity, noise, and/or jitters. As another example of hardware complexity in an FMCW radar system, digitizing the corresponding beat signal uses a high-speed analog-to-digital converter (ADC), which can add size and cost to the hardware. Further, digitally processing the high frame rate associated with FMCW detection entails a powerful baseband processor which is often inefficient in power. Thus, the PLL, ADC, and/or the baseband processor used in FMCW detection can not only add size, but additionally consume more power relative to lower frequency, slower-speed devices. Accordingly, this makes integrating an FMCW radar system into (smaller) wearable and mobile devices more difficult.

A two-tone radar detection system provides a compact and affordable system for in-the-air gesture detection relative to wideband radar systems by concurrently detecting absolute distance and relative movement of a target object. The two-tone gesture detection system can, at times, configure and/or reconfigure a signal source to alternate transmitting a first carrier frequency tone and a second carrier frequency tone. This approach allows for simplified signal source hardware relative to wide-band signal approaches. The radar-based detection device also captures return signals reflecting off a target object (e.g., a first return signal generated by the first carrier frequency tone reflecting off the target object, a second return signal generated by the second carrier frequency tone reflecting off the target object). Sometimes, the two-tone gesture detection system demodulates the first return signal and second return signal into a first set of baseband quadrature signals and a second set of baseband quadrature signals, such as through the use of a direct-conversion homodyne receiver. In turn, the radar-based detection device digitizes the baseband quadrature signals to generate a first set of digital samples and second set of digital samples, respectively. Various aspects extract phase offset and/or phase difference information from the quadrature signals to concurrently identify absolute distance and relative movement, such as by applying digital signal processing to the first set of digital samples and second set of digital samples. Upon determining absolute distance and relative movement, some radar-based gesture detection systems then determine an in-the-air gesture performed by the target object.

Figure 6:
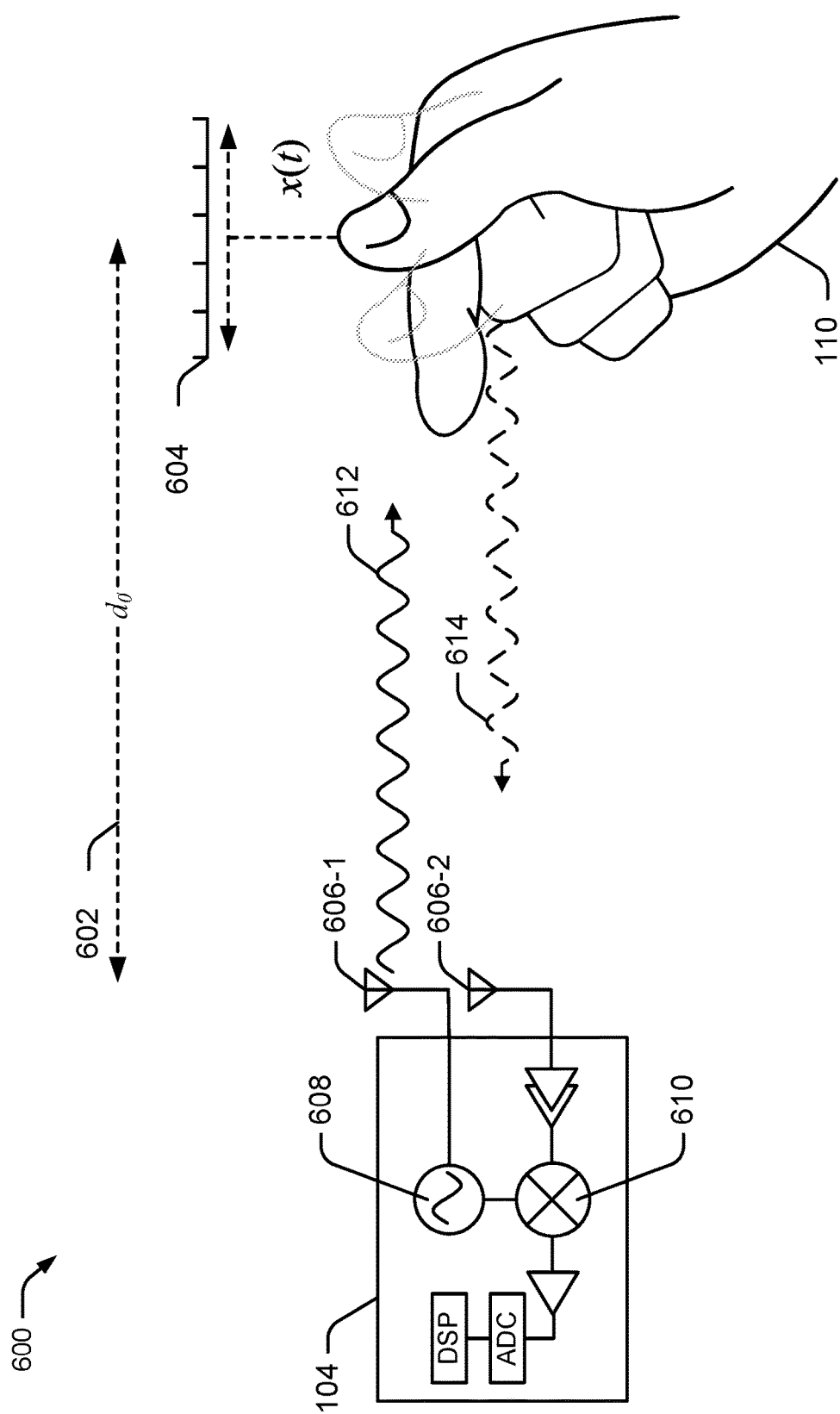
FIG. 6 illustrates an example environment that employs two-tone radar detection of gestures in accordance with one or more embodiments.

FIG. 6 illustrates environment 600, which includes radar-based gesture detection component 104 and hand 110 from FIG. 1. For discussion purposes, the components illustrated within radar-based gesture detection component 104 have been simplified, and are not intended to capture the detection component in its entirely. Here, hand 110 performs a micro-gesture in which a thumb swipes back and forth. For instance, some aspects include additional filtering steps (e.g., bandpass filtering, high-pass filtering, and/or or low-pass filtering) to isolate signals of interests. As further described herein, the micro-gesture can be identified by measuring the absolute distance 602 (labeled as do) of the thumb from radar-based gesture detection component 104, and the relative movement 604 (labeled as x(t)) of the thumb as it moves back and forth. Here, relative movement 604 represents an amount of movement (e.g., distance of movement, speed of movement) of the thumb relative to a fixed point identified as absolute distance 602.

To measure absolute distance 602 and relative movement 604, radar-based gesture detection component 104 includes two antennas: antenna 606-1 for transmitting two carrier frequency tones ($f_1$, $f_2$), and antenna 606-2 for receiving portions or all of the return signals generated by the carrier frequency tones reflecting off of hand 110. These carrier frequency tones can be generated in any suitable manner. Here, the carrier frequency tones are generated by electrically coupling a Voltage Controlled Oscillator (VCO) 608 to antenna 606-1. VCO 608 can be a radar-emitting element, such as radar-emitting element 210 of FIG. 2, configurable to alternate transmitting two carrier frequency tones, or be a clock source/oscillator coupled to a radar-emitting element that is used to synchronize time bases between various components contained within radar-based gesture detection component 104. Thus, radar-based gesture detection component 104 can sometimes configure and/or reconfigure the radar-emitting element to alternate between the transmitted carrier frequencies.

Radar-based gesture detection component 104 also includes receiver system 610, which is electrically coupled to antenna 606-2 to capture and process the incoming RF signals. Among other things, receiver system 610 includes a frequency mixer that can be used to demodulate incoming RF signals to baseband without using more complex PLL circuitry. Here, VCO 608 feeds into receiver system 610, and can be used as a signal source to use in the mixing and/or demodulating process. Since VCO 608 provides the two carrier frequency tones transmitted in the outgoing signals, it also provides receiver system 610 with a source signal that is at, or close enough to, one or both of the transmitted carrier frequencies. A signal is considered "close enough to" a transmitted carrier frequency when it allows receiver system 610 to successfully demodulate an incoming RF signal at, or close to, baseband so that information can be successfully recovered. Thus, when describing a signal as being at baseband, it is to be appreciated that in real-world implementations, the signals may deviate slightly, but still be usable enough to recover any desired information successfully. Since VCO 608 contributes to the generation of the transmitted carrier frequency tones ($f_1$, $f_2$), using it in the demodulation process substantially synchronizes the receiver (and subsequent demodulation process) to the transmitted frequencies.

Using VCO 608 in conjunction with receiver system 610 simplifies the overall hardware of radar-based gesture detection component 104 relative to other receiver systems. In turn, this positively impacts devices incorporating a gesture detection device since it has a reduced cost, size, and power consumption relative to more power hungry and spacious hardware systems (e.g., FMCW). Accordingly, these simplified designs enable gesture detection via radar to be integrated into smaller computing devices that have less space and power. In the case of a direct-conversion homodyne receiver system, using a same local oscillator that was used to transmit signals enables the receiver system to demodulate signals down to baseband quadrature without down-converting to an intermediate frequency (IF) first, thus simplifying the receiver chain. The baseband quadrature signals are then fed into ADC components to generate digital samples, which are then processed by the DSP component of radar-based gesture detection component 104. This, too, simplifies the hardware, as the quadrature signals are located at baseband, rather than a higher IF, thus allowing for an ADC with less sampling power.

Now consider determining absolute distance 602 and relative movement 604. In Doppler radar, the total accumulated phase residue at a receiver is dependent on the distance between the radar and/or receiver and the target. Thus, if total accumulated phase residue can be extracted, a system can determine an absolute distance. Applying this to FIG. 6, consider the case of antenna 606-1 alternately transmitting carrier frequency tones of $f_1$ and $f_2$, generally identified here as signals 612. These frequencies correspond to a phase residue of $\theta_1$ at the receiver when the radar carrier is at $f_1$, and a phase residue of $\theta_2$ when the carrier is tuned to $f_2$. Distance information can then be extracted from the phase difference $\Delta\theta=\theta_1-\theta_2$ as long as $\Delta f=|f_1-f_2|$ is sufficiently small. In terms of FIG. 6, as resultant signals 614 are received by antenna 606-2, phase residue can be extracted to determine absolute distance 602 as further described herein.

Figure 7:
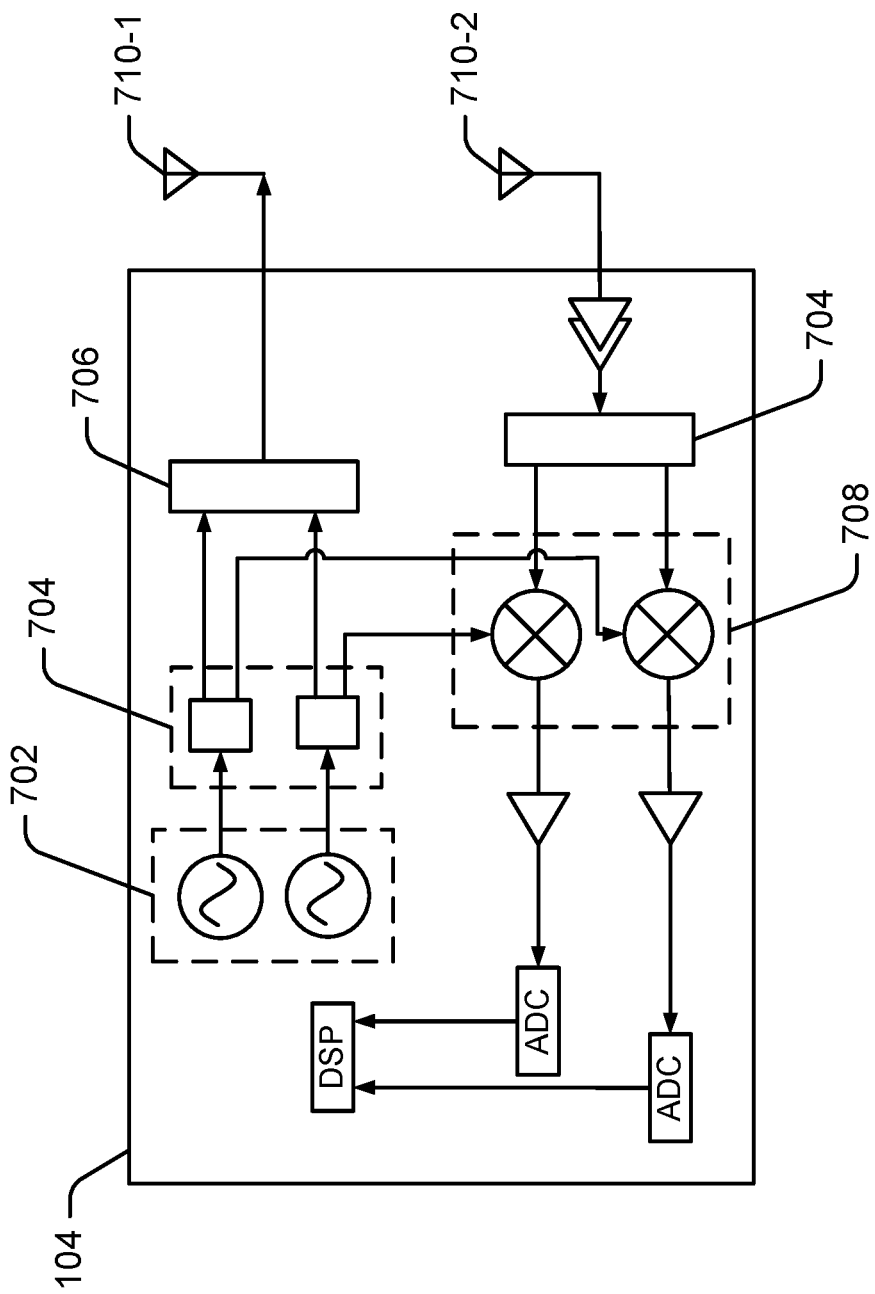
FIG. 7 illustrates an example two-tone radar detection system in accordance with one or more embodiments.

While FIG. 6 illustrates an example of radar-based gesture detection component 104 that reconfigures a single source generator to alternate between carrier frequency tones, FIG. 7 illustrates an example of radar-based gesture detection component 104 that enables carrier frequency tones to be transmitted simultaneously. For discussion purposes, the components illustrated within radar-based gesture detection component 104 in FIG. 7 have been simplified, and are not intended to capture the detection component in its entirely. For instance, some aspects include additional filtering steps (e.g., bandpass filtering, high-pass filtering, and/or low-pass filtering) to isolate signals of interests. At times, radar-based gesture detection component 104 as described with respect to FIG. 7 can be used to detect gestures in various environments, such as environment 100 of FIG. 1, and/or environment 600 of FIG. 6.

Radar-based gesture detection component 104 includes multiple signal generators 702. In some cases, each signal generator is a VCO as further described herein. To generate two tones simultaneously, a first signal generator of signal generators 702 transmits a first carrier frequency tone ($f_1$), and a second signal generator of signal generators 702 transmits a second carrier frequency tone ($f_2$). Each carrier frequency tone is then fed into a respective splitter of splitters 704 to generate two signals from each carrier frequency tone (resulting in four signals). A first set of signals of the split signals (e.g., a split version of $f_1$ and a split version of $f_2$) is then fed into a signal combiner 706, and a second set of signals of the split signals is fed into receiver system 708. Signal combiner 706 joins or combines the first set of split signals into a resultant (combined) signal, and feeds the resultant signal into antenna 710-1, thus providing simultaneous transmission of the carrier frequency signals.

On the receive side, antenna 710-2 captures incoming signals that are generated by the transmitted carrier frequency signals reflecting off a target object (such as hand 110 of FIGS. 1 and 6). Recalling that the transmitted signal includes a simultaneous transmission of two carrier frequency signals, the incoming signal, too, can include reflections of each carrier frequency signal. In order to process each reflected carrier frequency signal separately, radar-based gesture detection component 104 routes the incoming signal to another splitter of splitters 704 to generate two signals. A first signal of the split (incoming) signal is then routed to a first mixer within receiver system 708, and a second signal of the split (incoming) signal is routed to a second mixer of receiver system 708. In some cases, these mixers are used as part of one or more direct-conversion homodyne receiver systems. Accordingly, the first mixer of receiver system 708 utilizes the split version of split version of $f_1$ to generate baseband quadrature signals related to $f_1$, and a second mixer of receiver system 708 uses the split version of $f_2$ to generate baseband quadrature signals related to $f_2$, as further described herein. Each set of baseband quadrature signals are then fed into respective ADCs to generate digital samples that are subsequently processed to extract absolute phase and relative distance. As in the case of FIG. 6, the incoming signals received by antenna 710-2 can be used to extract phase residue information in order to determine absolute distance of the target object.

Figure 8:
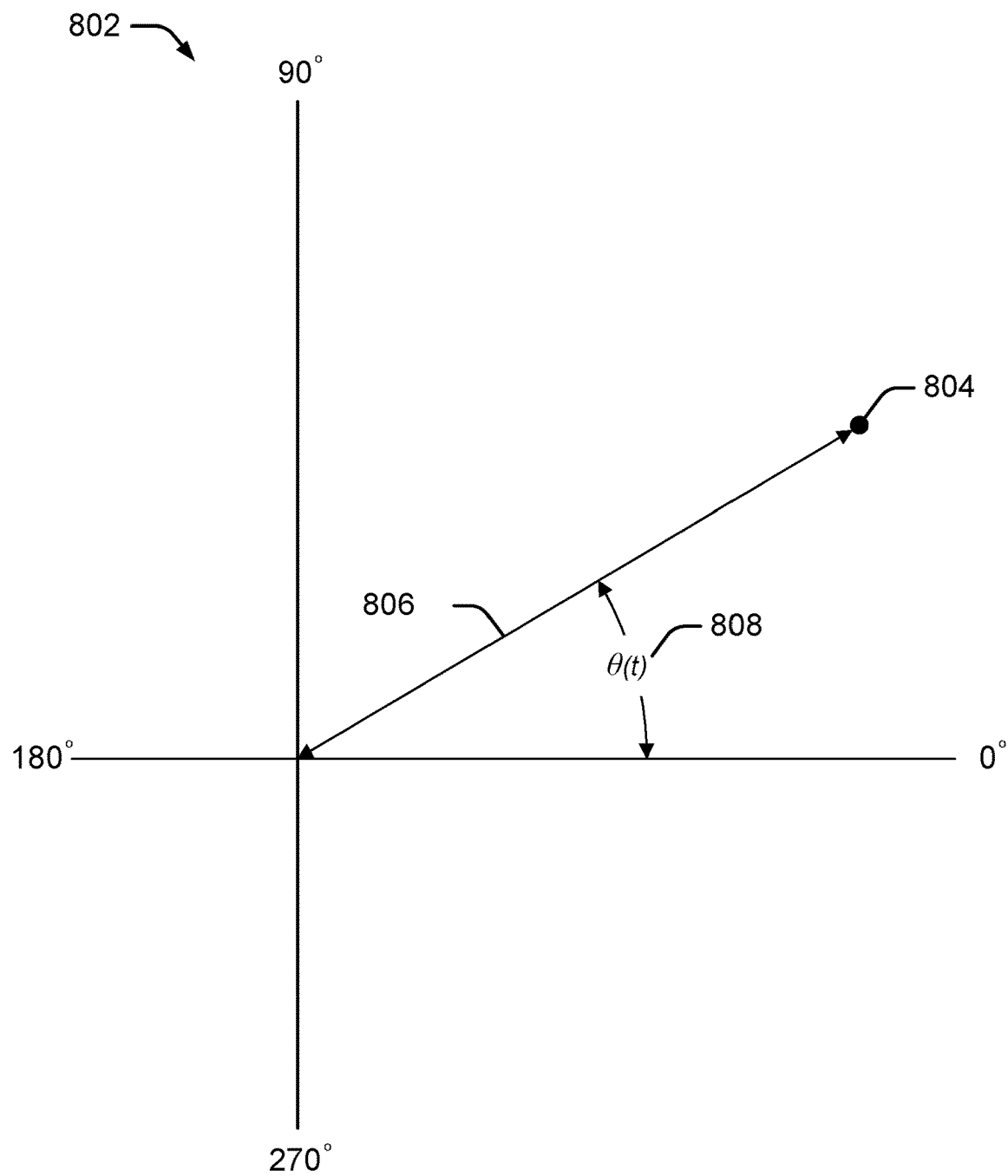
FIG. 8 illustrates a vector diagram of a carrier frequency signal in accordance with one or more embodiments.

To further illustrate, first consider FIG. 8, which illustrates a sinusoidal signal plotted in vector form. A sinusoidal signal at carrier frequency of $f_c$ can be generally represented as:

$$x(t)=A_c \cos(2\pi f_c t+\varphi) \quad (1)$$

where $A_c$ is the amplitude, $2\pi f_c$ is the frequency, and $\varphi$ is the phase of x(t). Collectively, the frequency and phase of x(t) (e.g., $2\pi f_c t+\varphi$) can be referred to as the phase angle, $\theta(t)$. Based upon this and the knowledge that x(t) is a sinusoidal signal, x(t) can be identified in vector form through its amplitude and phase angle. Plot 802 illustrates a polar coordinate system mapping of x(t) at an arbitrary point in time, t. A polar coordinate system characterizes a point in a two-dimensional system characterized by distance and angle. In this example, distance is based upon point of reference 0,0, and angle is based upon 0° as the angle of reference, with a counterclockwise direction indicating a positive angle. At arbitrary point in time t, the polar coordinate system plots x(t) at point 804, and characterizes this point as a vector having length 806 and angle 808. Thus, as t changes, point 804 changes, which additionally changes the instantaneous angle 808. In turn, the corresponding vector rotates around plot 802.

Now consider baseband quadrature signals, such as those generated by receiver system 610. Generally, two signals that are orthogonal or have a 90° phase difference from one another are considered to be "in quadrature". An in-phase component (e.g., the I-component) is considered to be the signal that is in phase with a point of reference (e.g., 0°) and a quadrature-phase component that is 90° out of phase with the I component (e.g., the Q component) is referred to as being orthogonal or "in quadrature" with the in-phase component. Applying this to the baseband quadrature (I/Q) outputs of receiver system 610, the output quadrature signals can be represented as:

$$I(t)=A_I \cos\ [4\pi x(t)/\lambda+\theta_0+\theta_r+\Delta\varphi(t)]+DC_I \quad (2)$$

$$Q(t)=A_Q \sin\ [4\pi x(t)/\lambda+\theta_0+\theta_r+\Delta\varphi(t)]+DC_Q \quad (3)$$

where $A_I$ and $A_Q$ are the amplitudes of the I and Q channels respectively, x(t) is the target relative movement or gesture motion (e.g., relative movement 604), $\lambda$ is the wavelength (inversely related to the corresponding carrier frequency tone), $\Delta\varphi(t)$ is the residual phase that is negligible in coherent radar due to range correlation effect, $\theta_0=4\pi d_0/\lambda$ is the phase shift caused by the distance between radar and target, $\theta_r$ is the phase delay at receiver (which can be regarded as a constant value for a small $\Delta f$), and $DC_I$ and $DC_Q$ are the Direct Current (DC) offsets, for the I and Q channels respectively, that can be calibrated out in DC calibration. Note from equations 2 and 3 that the relative movement (x(t)) affects the resultant quadrature signals.

Figure 9:
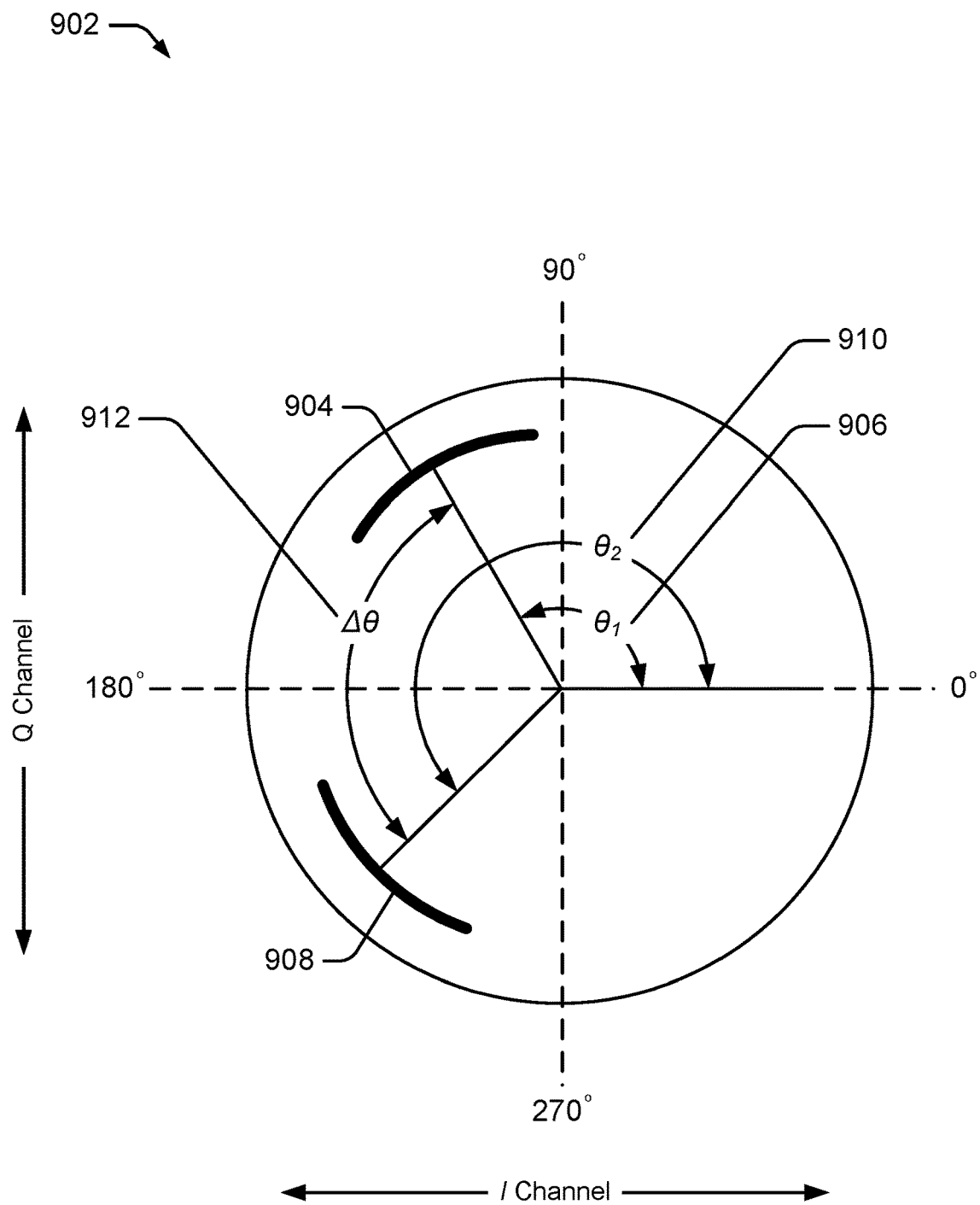
FIG. 9 illustrates an I/Q constellation diagram that can be utilized for two-tone radar detection of gestures in accordance with one or more embodiments.

Now consider FIG. 9, which illustrates an I/Q constellation diagram 902. In terms of quadrature signals, the horizontal axis of an I/Q constellation diagram represents the I-component (also referred to as the I-channel), and the vertical axis represents the Q-component (also referred to as the Q-channel). To plot a point, an I-value generated from the I-component at a particular point in time is plotted against a Q-value generated from the Q-component at that same particular point in time. The corresponding point can then be used to determined phase information.

In this example, I/Q constellation diagram 902 plots two separate baseband quadrature signals generated by receiver system 610. The first baseband quadrature signals correspond to first carrier frequency tone, $f_1$, where trajectory 904 represents the movement of the corresponding vector. Recall that a vector can be characterized in terms of length and phase. Accordingly, phase offset 906 (labeled here as $\theta_1$) represents the phase of the received signal. As in the case of FIG. 8, phase offset 906 has a positive value as it moves counterclockwise, and negative value as it moves clockwise, from reference point 0°. Similarly, trajectory 908 represents the movement of a vector of the baseband quadrature signals corresponding to carrier frequency tone $f_2$ when plotted on the constellation diagram, and has phase offset 910 (labeled here as $\theta_2$). These phase offsets can be expressed as:

$$\theta_1 = \frac{4\pi d_0}{\lambda_1} + \theta_r \quad (4)$$

$$\theta_2 = \frac{4\pi d_0}{\lambda_2} + \theta_r \quad (5)$$

where $\lambda_1$ and $\lambda_2$ correspond to the wavelengths of carrier frequency tones $f_1$ and $f_2$, respectively, $d_0$ is the absolute distance of interest, and $\theta_r$ is receiver delay (which can be considered a constant value). Noting that each trajectory has a range over which it spans, so, too, does it have a range of phase offsets. Accordingly, when determining absolute distance, the phase offset is estimated by using the center value of trajectory 904 (and trajectory 908, respectively), to the reference point of 0°. While these values can be estimated in hardware (e.g., planar microwave circuits, phase shifters), estimating the phase offsets using digital samples of the baseband quadrature signals can yield more accuracy in the estimate relative to hardware generated estimates. As further described herein, absolute distance can be determined by calculating $\theta_1$ and $\theta_2$. However, to save computational resources, the phase difference $\Delta\theta$ can be calculated instead.

Phase difference 912 represents the phase difference between phase offset 906 and phase offset 910. Using equations (4) and (5), this can be calculated by:

$$\theta_1 - \theta_2 = \Delta\theta = \left(\frac{1}{\lambda_1} - \frac{1}{\lambda_2}\right)4\pi d_0 = \frac{f_1 - f_2}{c}4\pi d_0 \quad (6)$$

where c is the speed of light, and $f_1$ and $f_2$ are, again, the carrier frequency tones. From this, the absolute distance can be determined by:

$$d_0 = \frac{c \cdot \Delta\theta}{4\pi(f_1 - f_2)} \quad (7)$$

As can be seen here, an absolute distance (such as absolute distance 602 of FIG. 6) can be determined with frequency tuning between two frequencies. Relative to beamforming techniques and/or a FMCW radar system, a two-tone approach to determining absolute distance simplifies hardware on both the transmission side and receive side, as well as the estimation process for the phase difference by estimating in the digital domain. It should be noted that the frequencies of the carrier frequencies $f_1/f_2$ do not impact the distance measurement. Instead, as show in equation (7), the difference in the two tones (e.g., $|f_1-f_2|=\Delta f$) is directly related in determining the absolute distance. Accordingly, any tones can be selected for the carrier frequencies. However, the carrier frequency has influence on the SNR and the length of I/Q trajectory because the radar signal frequency determines the modulation sensitivity in a displacement measurement (e.g., relative movement). Accordingly, some carrier frequencies may be more desirable than others to manage these influences.

It can be additionally noted that an ambiguity in measuring distance exists when $\Delta\theta$ exceeds 360°. In the case where $\Delta\theta$ exceeds 360°, the I/Q trajectory rotates back to its original location on the unit circle. Further, for a given distance, increasing the frequency spacing $\Delta f$ would increase the phase difference $\Delta\theta$, which is helpful for detecting small distances. When $\Delta\theta$ exceeds 180°, it becomes difficult to identify whether the phase difference of the two trajectories is clockwise or counter-clockwise. Therefore, various systems define $\Delta\theta=180°$ as the ambiguous condition. For an example of $\Delta f=40$ Megahertz (MHz), this frequency difference relates to a maximum distance of 1.875 m, which can be used for most gesture sensing applications based upon the knowledge that most human-computer interactions occur within this range. Thus, the frequency difference between the two tones can, at times, be application driven and/or the environment in which two-tone radar gesture detection is applied.

Having considered a discussion of absolute distance detection via a two-tone radar detection system, now consider a discussion of relative movement detection via a single-tone radar detection system in accordance with various aspects described herein.

Single Tone Detection of Relative Movement

As further described herein, a two-tone radar gesture detection system can be used to determine the absolute distance of a target object. Some aspects can also concurrently extract relative movement information about gesture motion by leveraging the nonlinear phase demodulation at either $f_1$ or $f_2$. By coupling the absolute distance information with relative movement information, a radar-based gesture detection component can detect and/or identify a micro-gesture from other gestures using a two-tone radar system. Accordingly, portions or all of the two-tone radar gesture detection system capable of absolute distance detection can also be used to determine relative movement of a target object.

Figure 10:
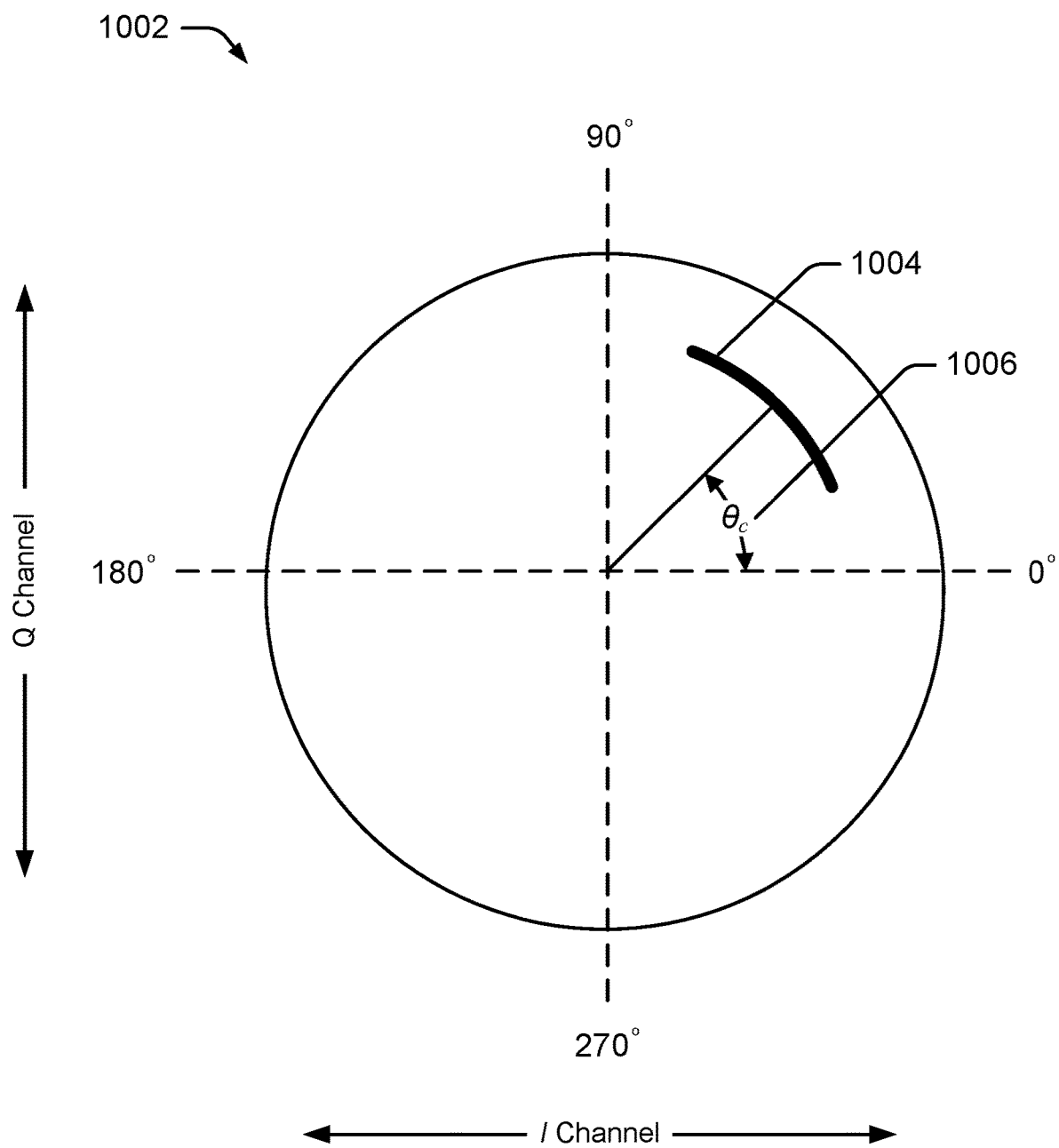
FIG. 10 illustrates an I/Q constellation diagram that can be utilized for two-tone radar detection of gestures in accordance with one or more embodiments.

FIG. 10 illustrates I/Q constellation diagram 1002, which includes a plot of a received signal at an arbitrary carrier frequency (radar) tone: $f_c$. In some cases, $f_c$ s leveraged from a same tone used in absolute distance detection (e.g., $f_1$ or $f_2$). As in the case of FIG. 9, the horizontal axis of I/Q constellation diagram 1002 represents the I-component of the received signal (e.g., I-channel), and the vertical axis represents the Q-component of the received signal (e.g., Q-channel). To plot a point on the corresponding constellation diagram, an I-value is plotted against a Q-value, each at a same arbitrary point in time. Alternately, these values can represent an average of multiple points over various points in time, or represent some other weighted combination of multiple values over time. Thus, as further described herein, a same carrier frequency tone utilized in two-tone radar detection of absolute distance detection can additionally be used to detect relative movement.

When plotted on I/Q constellation diagram 1002, f has a corresponding trajectory 1004. Here, I/Q constellation diagram 1002 positions trajectory 1004 generally centered at phase offset 1006 (labeled as $\theta_c$), where the value of phase offset 1006 is relative to 0°, increases in value as the corresponding vector rotates counterclockwise, and decreases in value as the corresponding vector rotates clockwise. For discussion purposes, FIG. 10 positions trajectory 1004, and phase offset 1006, in quadrant 1 of the constellation diagram (where both the I-value and the Q-value are positive). However, trajectory 1004 and phase offset 1006 can be positioned at any other location within the I/Q constellation diagram without departing from the scope of the claimed subject matter.

Through simplifications to equations (2) and (3), the I component and Q component of a received signal can be expressed as:

$$I(t) = \cos\left[\frac{4\pi x(t)}{\lambda_c} + \theta_c\right] \quad (8)$$

$$Q(t) = \sin\left[\frac{4\pi x(t)}{\lambda_c} + \theta_c\right] \quad (9)$$

where $\lambda_c$ is the wavelength of the carrier frequency tone (e.g., $f_1$ or $f_2$), $\theta_c$ is phase offset 1006, and x(t) is the relative movement. Solving for the relative movement x(t) yields:

$$x(t) = \frac{\lambda_c}{4\pi}\left[\tan^{-1}\left(\frac{Q(t)}{I(t)}\right) - \theta_c\right] \quad (10)$$

As in the case of absolute distance detection, the phase information can be determined in the digital domain using digitized samples of the baseband quadrature signals (e.g., the I-component and Q component signals). This approach yields a more accurate estimation of the phase offset, with the added benefit of simpler hardware in size, cost, and analog signal processing, when compared to analog methods.

Figure 11:
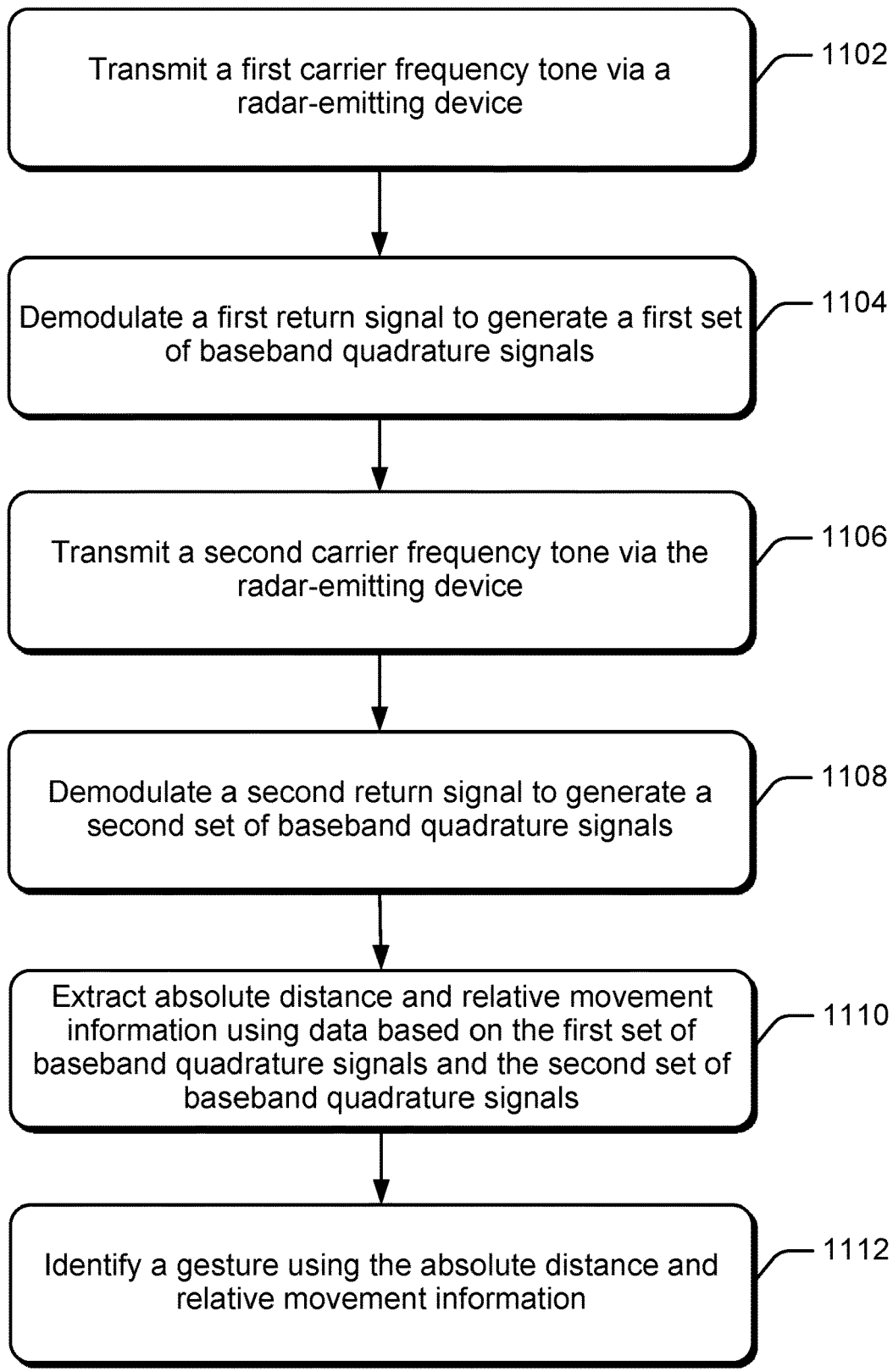
FIG. 11 illustrates an example flow diagram in accordance with one or more embodiments.

FIG. 11 is a flow diagram that describes steps in a method for concurrent detection of absolute distance and relative movement using a two-tone radar-based gesture detection system in accordance with various aspects described herein. The method can be implemented in connection with any suitable hardware, software, firmware, or combination thereof. In some cases, the method can be implemented by a suitably-configured system, such radar-based gesture detection component 104 of FIGS. 1, 2, and 4-6.

At 1102, the radar-based gesture detection device transmits a first carrier frequency tone via a radar-emitting device. The radar-based gesture detection device can determine what carrier frequency tone to transmit in any suitable manner, such as through a default value stored in memory, through a command received via a programmatic interface, through a calculation based upon a desired SNR value, and so forth. Any suitable frequency can be utilized for a carrier frequency tone. In some cases, the first carrier frequency is transmitted via an antenna electrically coupled to the radar-emitting device. The radar-emitting device can be any suitable type of signal source, such as a configurable VCO that can be configured/reconfigured to alternate the desired carrier frequency tones.

At 1104, the radar-based gesture detection device demodulates a first return signal to generate a first set of baseband quadrature signals. For example, as the first carrier frequency tone propagates from the radar-based gesture detection device, it can reflect off a target object to generate the first return signal. In turn, an antenna of the radar-based gesture detection device can receive and convert the propagating first return signal into an analog electronic waveform, which is then demodulated into baseband quadrature signals by the radar-based gesture detection device. This can be achieved in any suitable manner, such as through the use of a direct-conversion homodyne receiver. At times, the radar-based gesture detection device includes one or more ADC in order to generate a first set of digital samples from the first set of baseband quadrature signals.

At 1106, the radar-based gesture detection device transmits a second carrier frequency tone via the radar-emitting device. At 1108, the radar-based gesture detection device demodulates a second return signal into a second set of baseband quadrature signals. Similar to the first return signal, the second return signal can be generated by the second carrier frequency tone reflecting off the target object. Further, the radar-based gesture detection device can demodulate the second return signal into the second set of baseband quadrature signals in a similar manner it generated the first set of baseband quadrature signals. This can include generating a second set of digital samples by sampling the second set of baseband quadrature signals with synchronized ADCs.

At 1110, the radar-based gesture detection device extracts absolute distance and relative movement information using data based on the first set of baseband quadrature signals and the second set of baseband quadrature signals. For example, the radar-based gesture detection device can process the first set of digital samples and the second set of digital samples to extract phase offset information and/or phase difference information, examples of which are provided herein. Other times, the radar-based based gesture detection device can include hardware to extract phase offset information and/or phase difference information. At 1112, the radar-based gesture detection device identifies a gesture using the absolute distance and relative movement information.

While the method described in FIG. 11 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

Having considered a discussion of determining relative movement by leveraging tones used for absolute distance detection via a two-tone radar detection system, now consider some test results in accordance with various aspects described herein.

Empirical Test Results

To test two-tone radar detection of gesture identification or movement, a Newton's cradle was used to measure mechanical motion. A Newton's cradle consists of multiple identically sized metal balls suspended in a metal frame in series with one another. The balls are configured such that each ball just touches the respective adjacent ball or balls when at rest. When one ball at the end is lifted and released, it strikes the stationary balls, and a force is transmitted through the stationary balls to subsequently push the last ball upward. For testing purposes, however, instead of pulling and releasing one ball, all the five balls of the Newton's cradle were pushed together to a predefined position and then released. In this configuration, the Newton's cradle worked like a pendulum with a decaying sinusoidal motion. During the experiment, the five balls were always pushed to the same angle that the pendulum swings away from the vertical, so that the resonant frequency stayed constant for all pendulum motions.

To measure movement, a two-tone radar detection system using Doppler radar was placed 30 centimeters (cm) away from the Newton's cradle and was initially tuned to a carrier frequency tone at 2.4 Gigahertz (GHz). After transmitting the 2.4 GHz tone, information about the decaying pendulum motion was captured from reflected signals. Next, the two-tone radar detection system was tuned 40 MHz up to 2.44 GHz to measure the same movement.

Figure 12A:
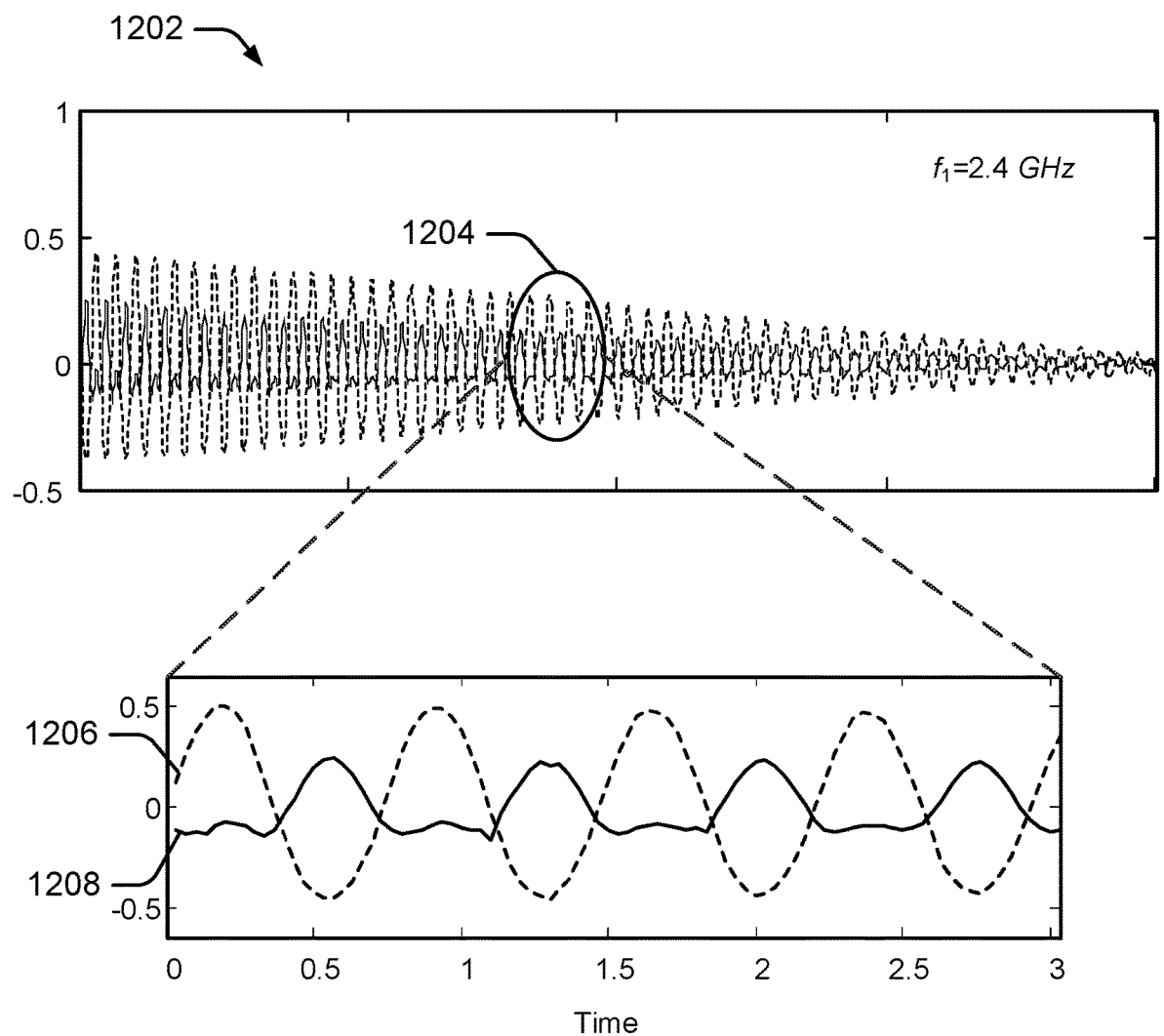
FIGS. 12a and 12b illustrates test results from an experiment using a two-tone radar detection system in accordance with one or more embodiments.
Figure 12A:
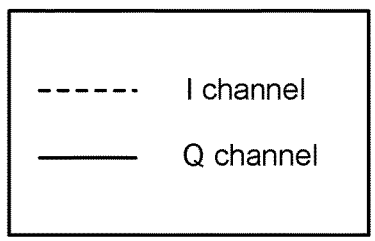
Figure 12B:
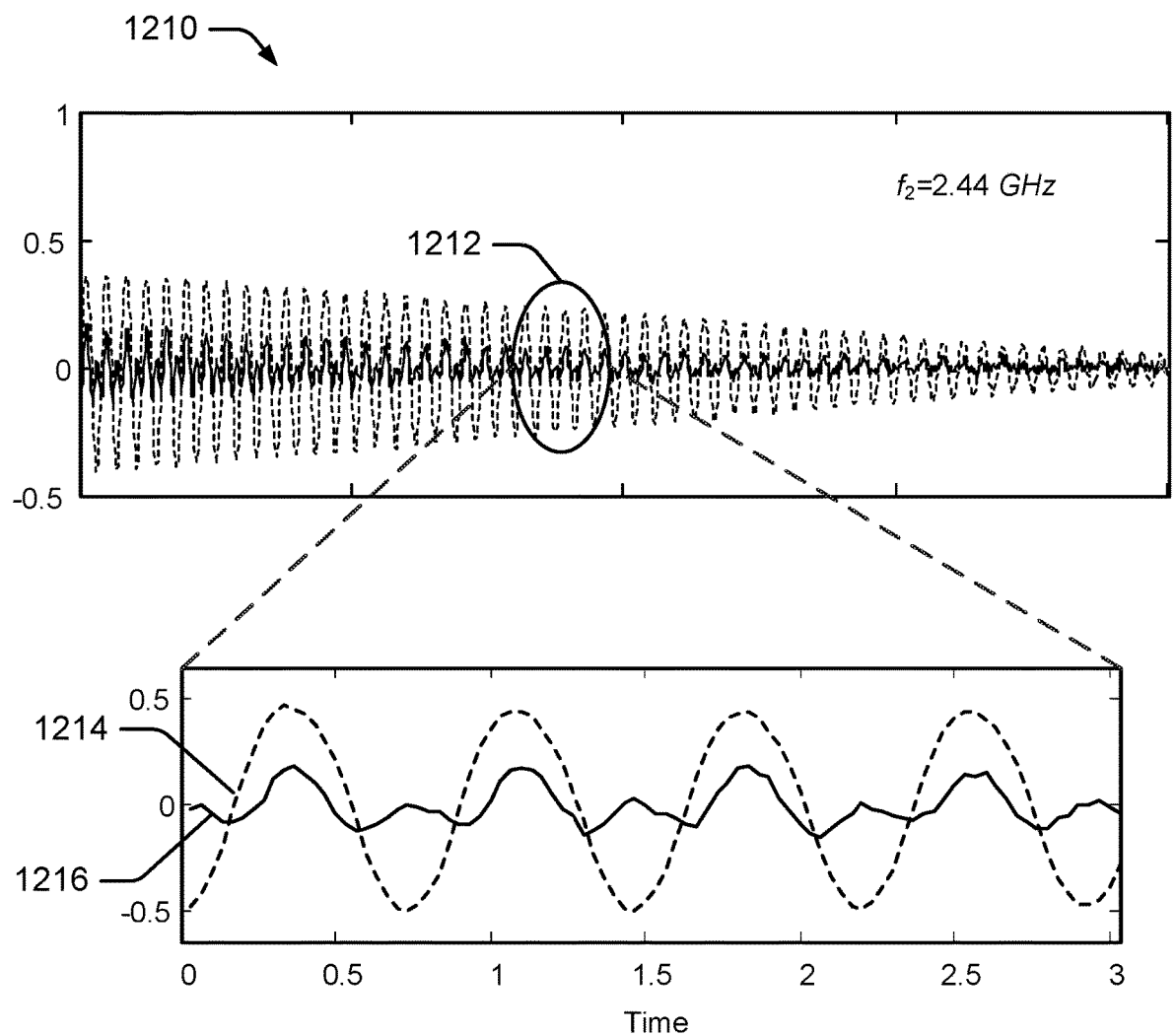

FIGS. 12a and 12b illustrate decaying motions measured by a two-tone radar gesture detection system at 2.4 GHz and 2.44 GHz respectively. FIG. 12a includes information pertaining to a carrier frequency tone at 2.4 GHz, while FIG. 12b includes information pertaining to a carrier frequency tone at 2.44 GHz. Graph 1202 illustrates the I and Q channels received (and measured) when 2.4 GHz was transmitted by the two-tone radar gesture detection system. To clarify the details of this graph, image 1204 of graph 1202 has been extracted and magnified below to illustrate more details. Here, image 1204 spans a 3 second window of time. Trace 1206 represents the I-channel capture at 2.4 GHz, while trace 1208 represents the Q-channel capture at 2.4 GHz. In a similar manner, graph 1210 illustrates I and Q channels received (and measured) when the two-tone radar gesture detection system transmitted 2.44 GHz. To clarify additional detail, image 1212 has been extracted and magnified below, where trace 1214 represents the I-channel capture at 2.44 GHz and trace 1216 represents the Q-channel capture at 2.44 GHz.

The decaying motion of the Newton's cradle can be seen through the decline of the signal amplitudes in both graph 1202 and graph 1210. It can also be seen in image 1204 that trace 1206 is out of phase with trace 1208 by roughly 90°. Conversely, trace 1214 and trace 1216 in image 1212 are more in phase with one another. Thus, the phase correlation between the I-channel and the Q-channel at 2.4 GHz I/Q signals differs from the phase correlation between the I-channel and the Q-channel at 2.44 GHz.

Figure 13:
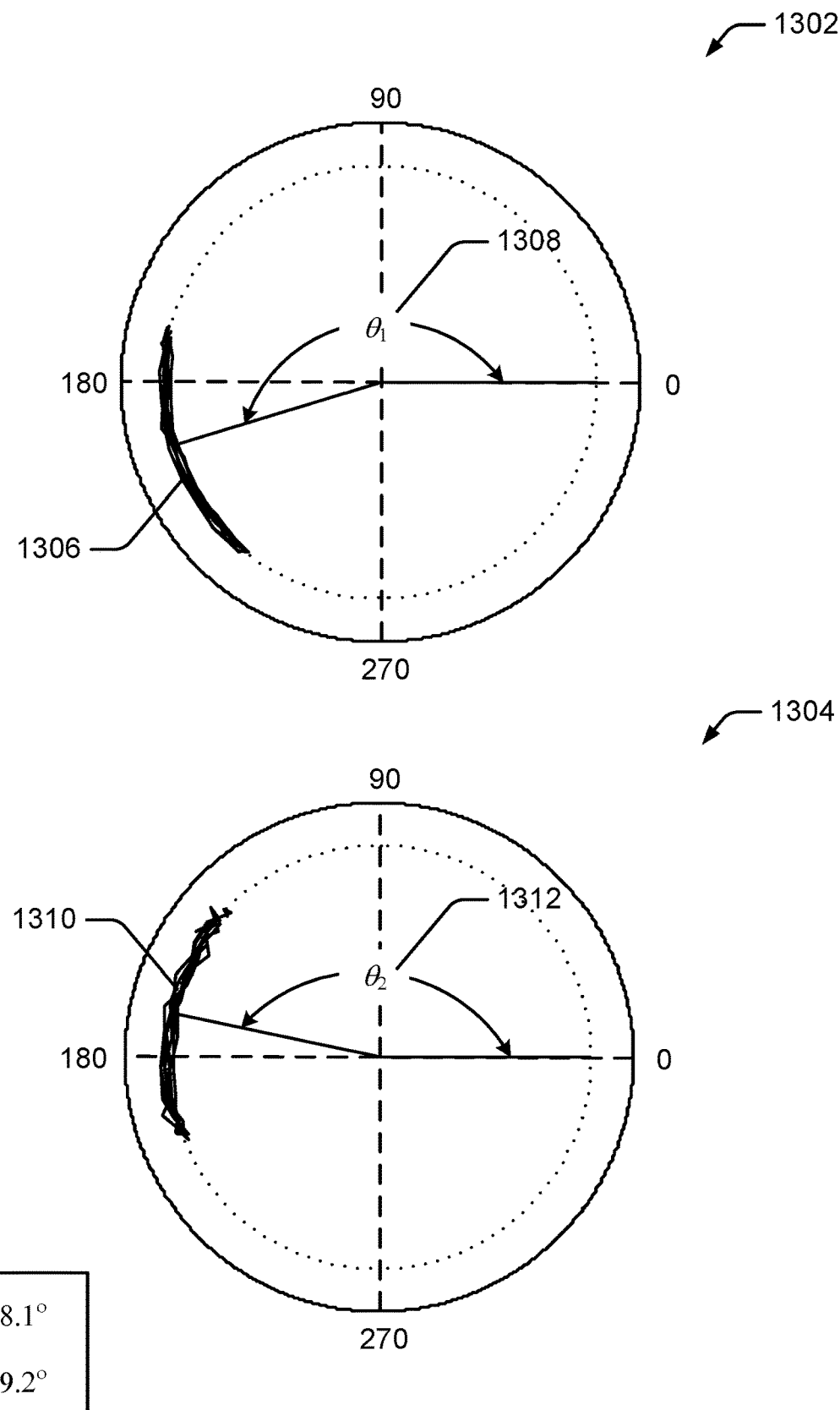
FIG. 13 illustrates test results from an experiment using a two-tone radar detection system in accordance with one or more embodiments.

Now consider FIG. 13, which illustrates I/Q trajectories of the same target motion measured in FIGS. 12a and 12b (e.g., the Newton's cradle). I/Q constellation diagram 1302 corresponds to carrier frequency $f_1$ operating at 2.4 GHz, while I/Q constellation diagram 1304 corresponds to carrier frequency $f_2$ operating at 2.44 GHz. When measured or estimated at its center, trajectory 1306 yields phase offset 1308, which is positioned at 198.1°. In a similar manner, measuring or estimating the center of trajectory 1310 yields a phase offset 1312 at 169.2°. These measurements or estimates can then be used to generate a phase difference of 28.9°, which corresponds to a distance of 30.1 cm. Recalling that the Newton's cradle in this experiment is positioned 30.0 cm away, this results in an estimate with 1 mm error. This error in the accuracy can be attributed to many different things. For instance, as discussed herein, absolute distance can be determined by estimating $\Delta\theta$ for a given $\Delta f$. However, the accuracy of calculating $\Delta\theta$ is partly dependent on SNR because the noise deviations can impact the accuracy of finding the center of the corresponding I/Q trajectories. As another example, the accuracy of $\Delta\theta$ can be impacted by other real-world imperfections in the generation and capture of the baseband quadrature signals, such as I/Q mismatch and signal distortions.

Figure 14:
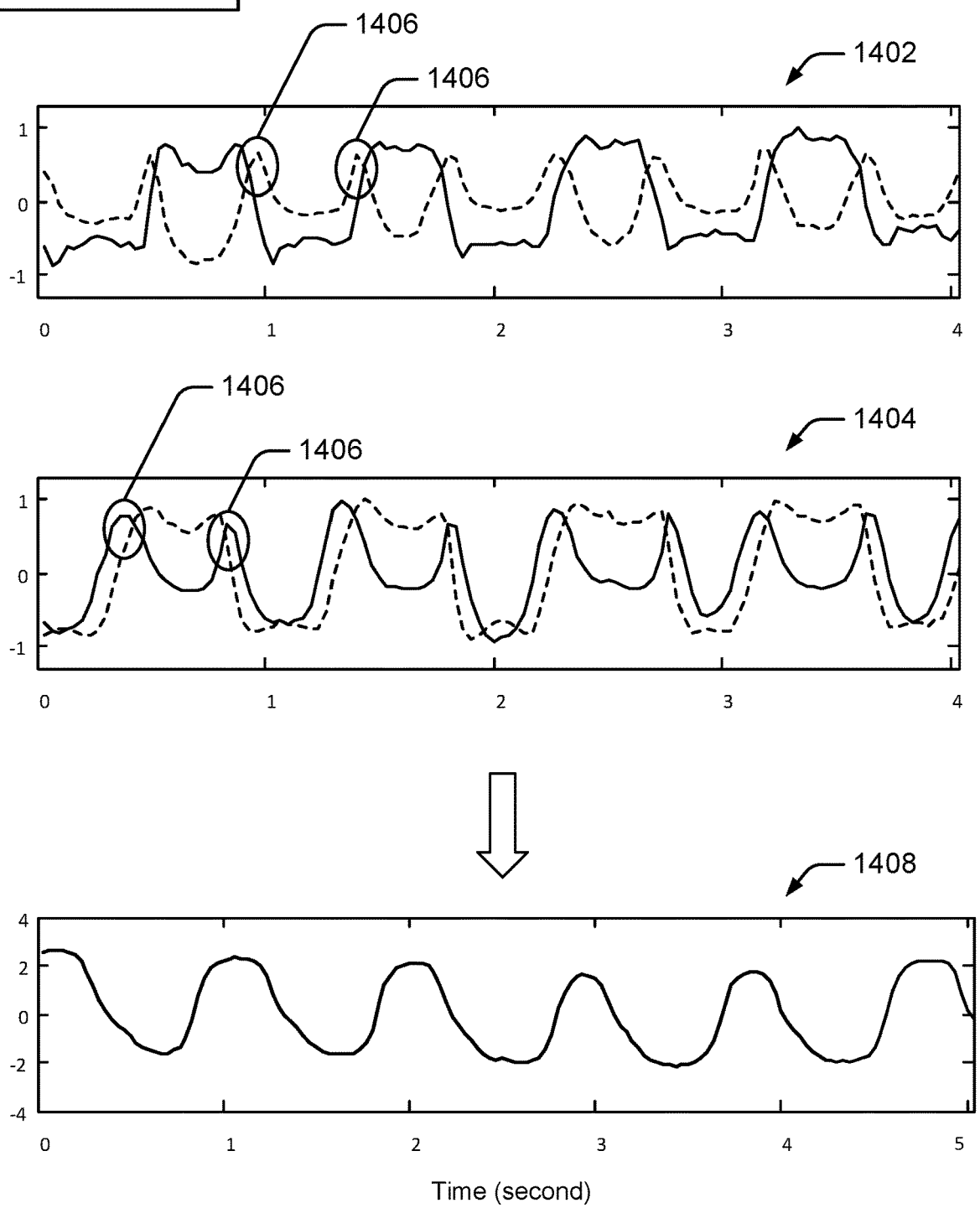
FIG. 14 illustrates test results from an experiment using a two-tone radar detection system in accordance with one or more embodiments.

An in-the air gesture motion was also measured using a two-tone radar gesture detection system. FIG. 14 illustrates experimental results when measuring an in-the-air "virtual slider" motion (e.g., moving the thumb along the side of the index finger as illustrated in FIG. 6). Graph 1402 illustrates I and Q channels of a received signal over an arbitrary window of time, where the transmitted carrier frequency $f_1$ is operating at 2.4 GHz. Similarly, graph 1404 illustrates I and Q channels of the received signal over the same arbitrary window of time when the transmitted carrier frequency $f_2$ is operating at 2.44 GHz. In comparing graph 1402 to graph 1404, it can be seen that the I/Q signals in graph 1402 are more "out of phase" with one another than the I/Q signals graph 1404. This difference in phase correlation between the I/Q signals in graph 1402 versus graph 1404 can be attributed to how changing a carrier frequency changes the phase distribution in the signal along the way when traveling from the radar to the target.

Similar to that described with the Newton's cradle experiment, distance information was then extracted by measuring (or estimating) the phase difference. However, given this experiment was conducted in a "real-world" environment, some variations in the resultant signals occurred. For example, circled "peaks" 1406 in graph 1402 and graph 1404 can be attributed to the phase modulation being nonlinear and the motion magnitude exceeding λ/8. To correct for this, phase unwrapping can be applied to avoid phase discontinuity in demodulation.

Graph 1408 shows the demodulated "virtual slider" motion being performed over another arbitrary window of time. Here, it can be seen that the motion has a peak-to-peak amplitude of about 4 cm. It is to be appreciated that, in general, the human hand is a complex structure relative to simpler structures (e.g., a pencil, a pen, a stylus). Accordingly, at times, the human hand can be modeled by using a summation of many dynamic scattering centers. The radar received signal is the superposition of reflections from all of these dynamic scattering centers. Accordingly, radar ranging is not to measure the distance to any specific finger, but rather the distance to the "average center" of all the dynamic scattering centers as illustrated in graph 1408.

Having considered some empirical test results using a two-tone radar-based gesture detection system, consider now an example system and device that can be utilized to implement various aspects of a two-tone radar-based gesture detection system as described herein.

Example Electronic Device

Figure 15:
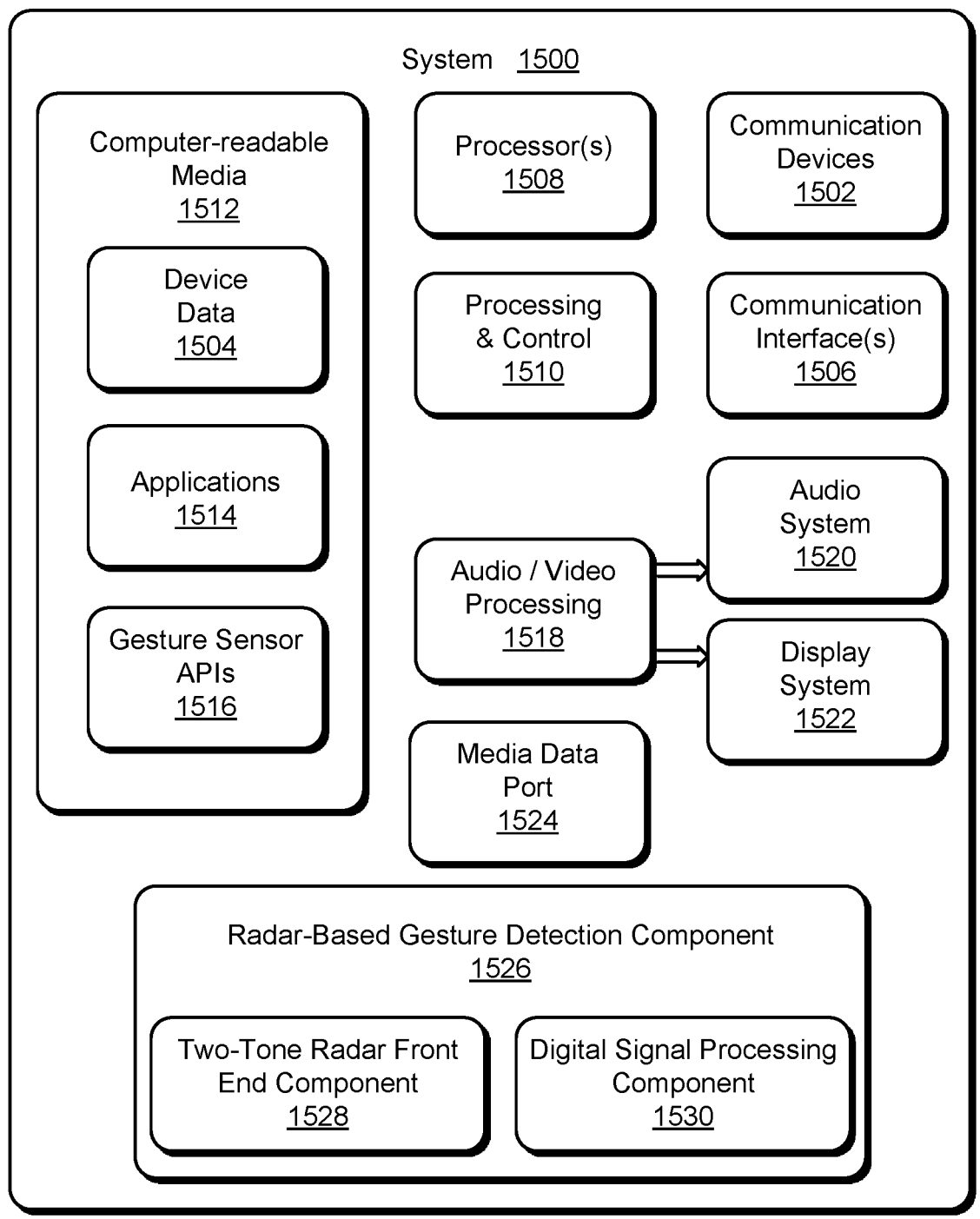
FIG. 15 illustrates an example device in which two-tone radar detection of in-the-air gestures can be employed in accordance with one or more embodiments.

FIG. 15 illustrates various components of an example system 1500 that incorporates a two-tone radar-based gesture detection system as described with reference to FIGS. 1-14. System 1500 may be implemented as any type of a fixed or mobile device, in any form of a consumer, computer, portable, user, communication, phone, navigation, gaming, audio, camera, messaging, media playback, and/or other type of electronic device, such as computing device 102 described with reference to FIGS. 1 and 2. In some cases, system 1500 can alternately be implemented as a printed circuit board (PCB), a chip-on-chip system, and so forth. Accordingly, various systems can include additional components that are not described, or exclude components that are described, with respect to system 1500.

System 1500 includes communication devices 1502 that enable wired and/or wireless communication of device data 1504 (e.g., received data, data that is being received, data scheduled for broadcast, data packets of the data, etc.). The device data 1504 or other device content can include configuration settings of the device and/or information associated with a user of the device.

System 1500 also includes communication interfaces 1506 that can be implemented as any one or more of a serial and/or parallel interface, a wireless interface, any type of network interface, a modem, and as any other type of communication interface. The communication interfaces 1506 provide a connection and/or communication links between system 1500 and a communication network by which other electronic, computing, and communication devices communicate data with system 1500.

System 1500 includes one or more processors 1508 (e.g., any of microprocessors, controllers, and the like) which process various computer-executable instructions to control the operation of system 1500 and to implement various aspects as described herein. Alternately or in addition, system 1500 can be implemented with any one or combination of hardware, firmware, or fixed logic circuitry that is implemented in connection with processing and control circuits which are generally identified at 1510. Although not shown, system 1500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

System 1500 also includes computer-readable storage media 1512, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable storage media 1512 provides data storage mechanisms to store and maintain the device data 1504, as well as storing and maintaining various applications, and any other types of information and/or data related to operational aspects of system 1500. Here, computer-readable storage media 1512 includes applications 1514, which generally represent applications with an ability to configure a radar-based gesture sensor component and/or receive notifications from the radar-based gesture sensor component. Other applications can include a device manager (e.g., a control application, software application, signal processing and control module, code that is native to a particular device, a hardware abstraction layer for a particular device, etc.). Computer-readable storage media 1512 also includes gesture sensor APIs 1516.

Gesture sensor APIs 1516 provide programmatic access to a gesture sensor component. The programmatic access can range from high-level programming access that obscures underlying hardware implementation details and/or how a function is implemented (e.g., no hardware configuration parameters or algorithmic parameters), to low-level programmatic access that enables an application to send low-level input configuration parameters associated with modifying how signals are transmitted, received, and/or processed by a gesture sensor component. In some cases, gesture sensor APIs 1516 can be used by applications 1514 to exchange data with a radar-based gesture sensor component.

System 1500 also includes audio and/or video processing system 1518 that processes audio data and/or passes through the audio and video data to audio system 1520 and/or to display system 1522 (e.g., a screen of a smart phone or camera). Audio system 1520 and/or display system 1522 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 1524. In some implementations, audio system 1520 and/or display system 1522 are external components to system 1500. Alternately, or additionally, display system 1522 can be an integrated component of the example electronic device, such as part of an integrated touch interface.

System 1500 also includes radar-based gesture detection component 1526 that wirelessly identifies one or more features of a target object, such as a micro-gesture performed by a hand. Radar-based gesture detection component 1526 can be implemented as any suitable combination of hardware, software, firmware, and so forth. At times, radar-based gesture detection component 1526 is implemented as an SoC. Among other things, radar-based gesture detection component 1526 includes two-tone radar front-end component 1528 and digital signal processing component 1530.

Two-tone radar front-end component 1528 transmits RF signals that propagate towards a target of interest, and receives reflections of these RF signals off a target of interest. These tones can be transmitted simultaneously, or alternately. In some cases, two-tone radar front-end component includes antennas for transmitting and receiving the propagating signals. These RF signals are configured to provide a radar field, such as a radar field generated by emitting carrier frequencies. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand. At times, two-tone radar front-end component includes a VCO that is used as a signal source to generates the RF signals. Two-tone radar front-end component 1528 also includes a receiver system, such as a homodyne receiver system, that can downconvert a received signal into baseband signals, including quadrature baseband signals. In some cases, the receiver system of two-tone radar front-end component 1528 is coupled to the signal source to aid in demodulating the received signals to baseband signals. Upon demodulating the received signal into baseband signals, the two-tone radar front end component routes them to digital signal processing component 1530.

Digital signal processing component 1530 digitally samples the baseband signals received from two-tone radar front-end component 1528, and processes them to extract information about the target object. Some aspects of digital signal processing component 1530 concurrently extract absolute distance and relative movement about the target object based upon the transmitted carrier frequencies. Digital signal processing component 1530 can include multiple digital signal processing algorithms that can be selected or deselected for an analysis, examples of which are provided herein. At times, an application, such as one of applications 1514, can configure the operating behavior of digital signal processing component 1530 via gesture Sensor APIs 1516.

CONCLUSION

A gesture detection system uses two radar tones to concurrently detect absolute distance and relative movement of a target object. A radar-based detection device alternates transmitting a first radar tone and a second radar tone via a radar-emitting device, and then captures a first return signal and a second return signal which are generated by the first radar tone and second radar tone reflecting off the target object. The radar-based detection device demodulates the return signals into a first set of quadrature signals and a second set of quadrature signals and, in some cases, generates a first set of digital samples and second set of digital samples from the respective quadrature signals. Various aspects process the first set of digital samples and second set of digital samples to concurrently identify absolute distance and relative movement and, at times, determine an in-the-air gesture performed by the target object.

Although various aspects of two-tone radar-based gesture detection have been described in language specific to structural features and/or methodological acts, it is to be understood that the various aspects defined in the appended claims are not necessarily limited to the specific features or acts described. Rather, the specific features and acts are disclosed as example forms of implementing the various aspects.

What is claimed is:

1. A device comprising:
   a processing system; and
   a radar-based gesture detection component implemented at least partially in hardware and comprising:
   a two-tone radar front-end component comprising a radar-emitting element for emitting a first carrier frequency tone and a second carrier frequency tone;
   an antenna for receiving incoming radio frequency (RF) signals generated by the first carrier frequency tone and the second carrier frequency tone reflecting off a target object;
   a direct-conversion homodyne receiver electrically coupled to the antenna for receiving the incoming RF signals from the antenna and converting the incoming RF signals into baseband quadrature signals;
   at least one analog-to-digital converter (ADC) to digitize the baseband quadrature signals to generate digital samples; and
   a processing pipeline component for detecting absolute distance and relative movement information about the target object by processing the digital samples.

2. The device as recited in claim 1, wherein the radar-emitting element comprises a Voltage Controlled Oscillator (VCO).

3. The device as recited in claim 2, wherein the direct-conversion homodyne receiver is electrically coupled to the VCO.

4. The device as recited in claim 1, wherein the digital samples comprise:
   a first set of digital samples generated from a first set of baseband quadrature signals associated with the first carrier frequency tone;
   a second set of digital samples generated from a second set of baseband quadrature signals associated the second carrier frequency tone; and
   wherein detecting absolute distance and relative movement information further comprises concurrently detecting absolute distance and relative movement information by:
   processing the first set of digital samples and the digital samples to extract phase difference information associated with the first set of baseband quadrature signals and the second set of baseband quadrature signals;
   extracting absolute distance using the phase difference information;
   processing the first set of digital samples or the second set of digital samples to extract phase offset information; and
   extracting relative movement information using the phase offset information.

5. The device as recited in claim 1, wherein first carrier frequency tone and the second carrier frequency tone have a frequency difference of 40 Megahertz (MHz).

6. The device as recited in claim 1, wherein the radar-based gesture detection component reconfigures the radar-emitting element to alternate transmitting the first carrier frequency tone and the second carrier frequency tone.

7. The device as recited in claim 1, wherein the processing pipeline component uses the absolute distance and the relative movement information to identify an in-the-air gesture performed by the target object from multiple gestures.

8. The device recited in claim 7, wherein the radar-based gesture detection component utilizes a programmatic interface to send a notification that the in-the-air gesture has been detected.

9. A method comprising:
   transmitting, using a radar-based gesture detection system, a first carrier frequency tone via a radar-emitting element of the radar-based gesture detection system;
   demodulating, using the radar-based gesture detection system, a first return signal generated by the first carrier frequency tone reflecting off a target object to generate a first set of baseband quadrature signals;
   transmitting, using the radar-based gesture detection system, a second carrier frequency tone via the radar-emitting element of the radar-based gesture detection system;
   demodulating, using the radar-based gesture detection system, a second return signal generated by the second carrier frequency tone reflecting off a target object to generate a second set of baseband quadrature signals;
   concurrently extracting, using the radar-based gesture detection system, absolute distance and relative movement information based, at least in part, on the first set of baseband quadrature signals and the second set of baseband quadrature signals; and
   identifying a gesture performed by the target object using the absolute distance and relative movement information.

10. The method as recited in claim 9, further comprising:
    sampling the first set of baseband quadrature signals to generate a first set of digital samples;
    sampling the second set of baseband quadrature signals to generate a second set of digital samples;
    processing the first set of digital samples and the second set of digital samples to extract phase difference information used in the extracting the absolute distance; and
    processing the first set of digital samples or the second set of digital samples to extract phase offset information used in the extracting the relative movement information.

11. The method as recited in claim 10, wherein the sampling the first set of baseband quadrature signals or the sampling the second set of baseband quadrature signals further comprises:

utilizing a first Analog-to-Digital converter (ADC) to sample an in-phase component (I-component) of the first set of baseband quadrature signals or the second set of baseband quadrature signals; and utilizing a second ADC synchronized to the first ADC to sample a quadrature-phase component (Q-component) of the first set of baseband quadrature signals or the second set of baseband quadrature signals.

12. The method as recited in claim 9, wherein the demodulating the first return signal to generate the first set of baseband quadrature signals or the demodulating the second return signal to generate the second set of baseband quadrature signals further comprises:

utilizing a direct-conversion homodyne receiver to demodulate the first return signal or the second return signal.

13. The method as recited in claim 12, further comprising:

utilizing a Voltage Controlled Oscillator (VCO) as at least part of the radar-emitting element; and using, in the demodulating the first return signal or the demodulating the second return signal, a signal source generated by electrically coupling the VCO to the direct-conversion homodyne receiver.

14. The method as recited in claim 9, further comprising:

receiving, at the radar-based gesture detection device, information associated with the first carrier frequency tone or the second carrier frequency tone via a programmatic interface; and configuring the radar-emitting element based, at least in part, on the information associated with the first carrier frequency tone or the second carrier frequency tone.

15. The method as recited in claim 9, further comprising:

selecting the first carrier frequency tone and the second carrier frequency tone based, at least in part, on a signal-to-noise ratio (SNR).

16. The method as recited in claim 9, wherein the concurrently extracting the absolute distance and the relative movement information further comprises:

identifying a first trajectory associated with the first set of baseband quadrature signals;

identifying a second trajectory associated with the second set of baseband quadrature signals;

determining a phase difference between a first phase offset associated with a center of the first trajectory and a second phase offset associated with a center of the second trajectory; and utilizing the phase difference to perform the extracting the absolute distance.

17. A device comprising:

a two-tone radar front-end component for:
transmitting a first carrier frequency tone;
receiving a first return signal generated by the first carrier frequency tone reflecting off a target object;
demodulating the first return signal into a first set of baseband quadrature signals;
transmitting a second carrier frequency tone;
receiving a second return signal generated by the second carrier frequency tone reflecting off the target object; and
demodulating the second return signal into a second set of baseband quadrature signals; and a digital signal processing component for:
generating a first set of digital samples from the first set of baseband quadrature signals;
generating a second set of digital samples from the second set of baseband quadrature signals; and
concurrently extracting absolute distance and relative movement information associated with the target object by processing the first set of digital samples and the second set of digital samples.

18. The device as recited in claim 17, wherein the two-tone radar front-end component comprises:

a direct-conversion homodyne receiver for demodulating the first return signal and the second return signal;

a radar-emitting element that is configurable to alternate transmitting the first carrier frequency tone and the second carrier frequency tone;

a first antenna electrically coupled to the radar-emitting element for transmitting the first carrier frequency tone and the second carrier frequency tone; and a second antenna electrically coupled to the direct-conversion homodyne receiver for receiving the first return signal and the second return signal.

19. The device as recited in claim 17, wherein the digital signal processing component comprises:

at least two synchronized Analog-to-Digital converters (ADC) for generating the first set of digital samples or the second set of digital samples as a respective set of quadrature digital samples; and a processing pipeline component for processing the respective set of quadrature digital samples.

20. The device as recited in claim 17, wherein the device is a system-on-chip (SoC).

* * * * *